US009877012B2

(12) United States Patent
Uchiyama et al.

(10) Patent No.: US 9,877,012 B2
(45) Date of Patent: Jan. 23, 2018

(54) IMAGE PROCESSING APPARATUS FOR ESTIMATING THREE-DIMENSIONAL POSITION OF OBJECT AND METHOD THEREFOR

(71) Applicant: CANON KABUSHIKI KAISHA, Tokyo (JP)

(72) Inventors: Hiroyuki Uchiyama, Kawasaki (JP); Muling Guo, Kawasaki (JP); Kotaro Yano, Tokyo (JP); Ichiro Umeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/084,381

(22) Filed: Mar. 29, 2016

(65) Prior Publication Data

US 2016/0292533 A1 Oct. 6, 2016

(30) Foreign Application Priority Data

Apr. 1, 2015 (JP) ................................ 2015-074942
Jun. 30, 2015 (JP) ................................ 2015-131841

(51) Int. Cl.
*G06K 9/00* (2006.01)
*H04N 13/02* (2006.01)
(Continued)

(52) U.S. Cl.
CPC .......... *H04N 13/0282* (2013.01); *G06T 7/55* (2017.01); *G06T 7/593* (2017.01);
(Continued)

(58) Field of Classification Search
USPC ........................................................ 382/154
See application file for complete search history.

(56) References Cited

U.S. PATENT DOCUMENTS 6,323,895 B1 * 11/2001 Sata ........................ A63F 13/10
348/39
2008/0129825 A1 * 6/2008 DeAngelis ......... A63B 24/0021
348/169
(Continued)

FOREIGN PATENT DOCUMENTS

JP 2010-063001 A 3/2010

OTHER PUBLICATIONS

Hattori Hiroshi; "Stereo Vision Technology for Automotive Applications," Feature Articles, Vo. 63, No. 5, 2008; pp. 48-51.
(Continued)

*Primary Examiner* — Jerome Grant, II
(74) *Attorney, Agent, or Firm* — Canon USA, Inc., IP Division

(57) ABSTRACT

An image processing apparatus includes a holding unit configured to hold a positional relationship of a plurality of image capturing units, an acquisition unit configured to detect objects from respective images captured by the plurality of image capturing units and acquire positions of the objects on the captured images and geometric attributes of the objects, an associating unit configured to associate the detected objects, based on the positional relationship, the positions and the geometric attributes, and an estimation unit configured to estimate a three-dimensional position of the objects based on the positional relationship and the positions of the detected objects.

36 Claims, 21 Drawing Sheets

(51) Int. Cl.
  *H04N 13/00* (2006.01)
  *H04N 13/04* (2006.01)
  *G06T 7/593* (2017.01)
  *G06T 7/55* (2017.01)
(52) U.S. Cl.
  CPC ..... *H04N 13/0011* (2013.01); *H04N 13/0242* (2013.01); *H04N 13/0246* (2013.01); *H04N 13/0468* (2013.01); *G06K 9/00369* (2013.01); *G06T 2207/20088* (2013.01); *G06T 2207/30196* (2013.01)

(56) References Cited

U.S. PATENT DOCUMENTS

| | | | | |
|---|---|---|---|---|
| 2008/0312866 A1* | 12/2008 | Shimomura | G06T 7/521 | 702/155 |
| 2010/0316282 A1* | 12/2010 | Hope | G06T 7/55 | 382/154 |
| 2011/0102551 A1* | 5/2011 | Iwasaki | G06T 3/40 | 348/46 |
| 2012/0035934 A1* | 2/2012 | Cunningham | G06F 1/1639 | 704/260 |
| 2013/0216094 A1* | 8/2013 | DeLean | G06K 9/00335 | 382/103 |
| 2015/0109419 A1* | 4/2015 | Vollrath | G01C 3/02 | 348/47 |
| 2015/0297949 A1* | 10/2015 | Aman | G06F 17/30781 | 348/157 |
| 2016/0065990 A1* | 3/2016 | Shimizu | H04N 19/597 | 375/240.12 |
| 2016/0220215 A1* | 8/2016 | Kwak | A61B 6/54 | |
| 2017/0082521 A1* | 3/2017 | May | G01M 11/0221 | |
| 2017/0123063 A1* | 5/2017 | Yamashita | G01S 17/023 | |

OTHER PUBLICATIONS

Zhengyou Zhang; "A Flexible New Technique for Camera Calibration;" IEEE Transactions on Pattern Analysis and Machine Intelligence, 22(11):1330-1334, 2000; Dec. 2, 1008, pp. 1-22.

Pierre Moulon et al.; "Adaptive structure from motion with a contrario model estimation;" UniversitéParis-Est, LIGM (UMR CNRS), Center for Visual Computing, ENPC; ACCV 2012., pp. 1-14.

Michael D. Breitenstein et al.; "Robust tracking-by-detection using a detector confidence particle filter;" 2009 IEEE 12th International Conference on Computer Vision (ICCV); 2009 IEEE; pp. 1515-1522.

* cited by examiner

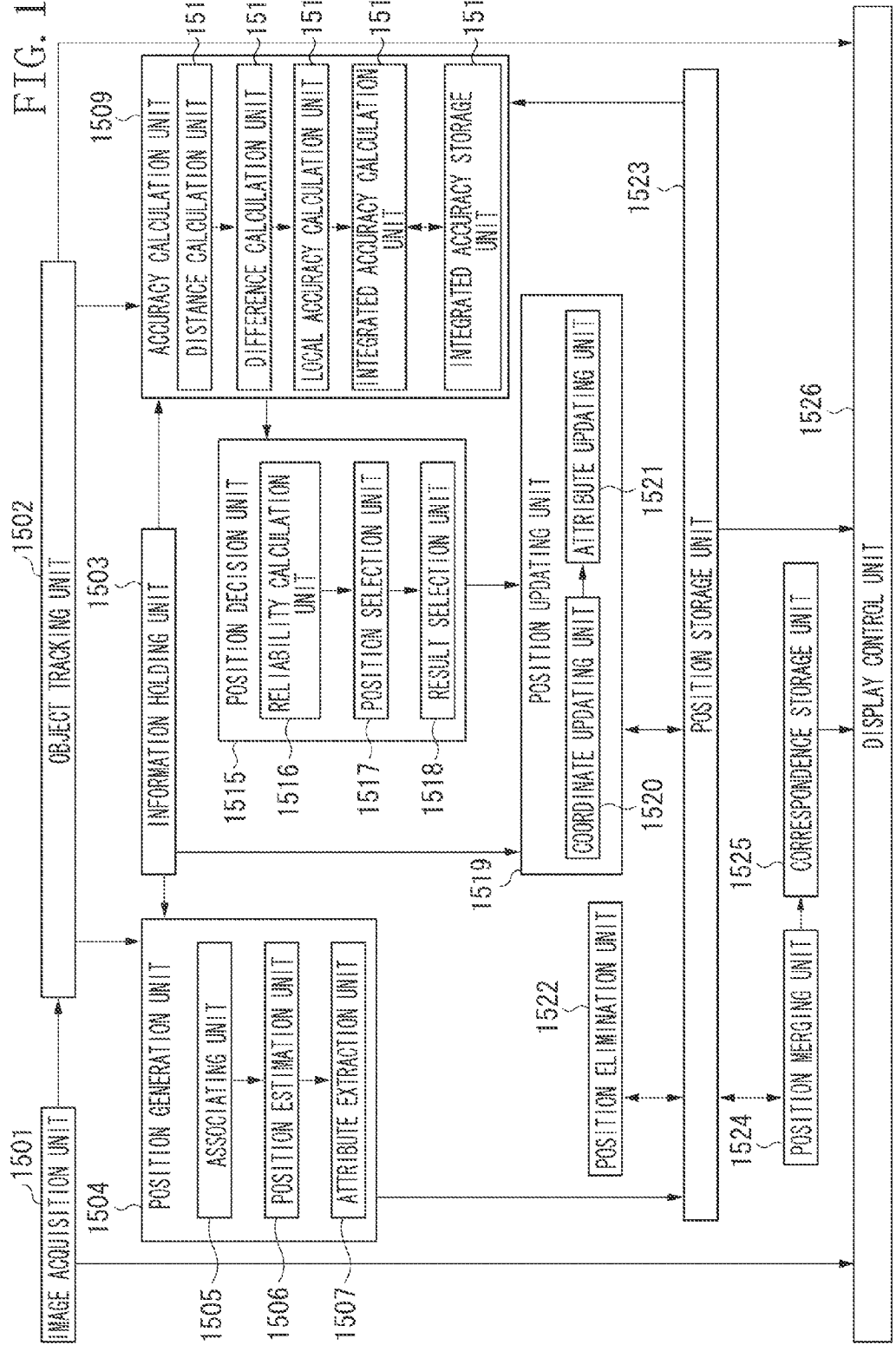

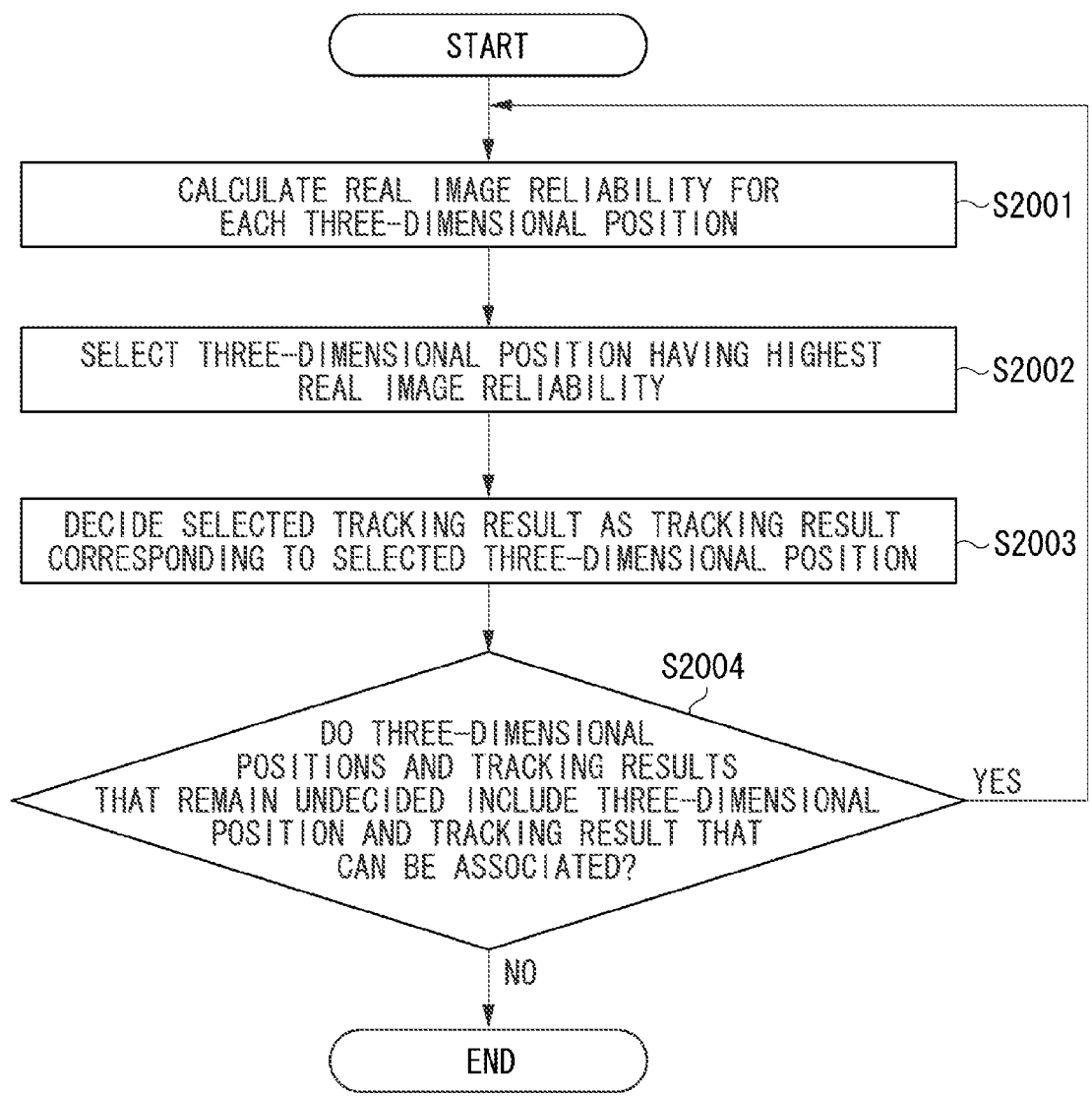

IMAGE PROCESSING APPARATUS FOR ESTIMATING THREE-DIMENSIONAL POSITION OF OBJECT AND METHOD THEREFOR

BACKGROUND OF THE INVENTION

Field of the Invention

The present invention relates to an image processing apparatus configured to estimate the three-dimensional position of an object from images captured by a plurality of cameras and a method therefore.

Description of the Related Art

There have been proposed methods for estimating the three-dimensional position of an object by capturing images of the object with a plurality of cameras having overlapping fields of view in a monitoring camera system. In the methods, images of a subject are captured by cameras located in positions that are known, and the three-dimensional position of the subject is estimated based on the positions of the subject on the camera images by use of the stereoscopic principle. At this time, there arises a situation that a false three-dimensional position is estimated as a virtual image. Hereinafter, a "position in which a subject actually does not exist" is sometimes referred to as a "false three-dimensional position," and a situation in which "it is estimated that a subject exists in the three-dimensional position" is sometimes referred to as a situation in which "a false three-dimensional position is estimated as a virtual image."

For example, there may be a case where a camera 1 captures a human body B while a camera 2 captures human bodies A and B as illustrated in FIG. 2. In this case, while the correct position of the human body B is estimated, an intersection point of a straight line connecting an optical center C1 of the camera 1 to the human body B and a straight line connecting an optical center C2 of the camera 2 to the human body A is estimated as the position of a virtual image V.

A solution to the foregoing situation is discussed in Japanese Patent Application Laid-Open No. 2010-063001. Specifically, three-dimensional movement trajectories of human bodies are acquired, and fragments of the three-dimensional movement trajectories are combined together to calculate complete movement trajectories of the respective human bodies. By combining together the trajectories of a predetermined length of time, a virtual image is eliminated. Hereinafter, to prove that a subject does not exist in a false three-dimensional position is sometimes referred to as "to eliminate a virtual image."

Further, a virtual image occurs due to ambiguous association of human bodies between cameras. Thus, in the stereoscopy, a method is often employed in which image information about colors, textures, etc. of object areas is compared between cameras and whether the object areas correspond to the same object is determined to eliminate a virtual image (for example, refer to Hiroshi Hattori, "Stereo Vision Technology for Automotive Applications," Journal of Society of Automotive Engineers of Japan, 63(2), 89-92, 2009-Feb. 2001 (hereinafter, "Hattori").

In the method discussed in Japanese Patent Application Laid-Open No. 2010-063001, a large number of frames are used to eliminate a virtual image. Thus, the method is not applicable to a situation in which promptness is required. Further, in the method discussed in Hattori, since image information such as colors, textures, etc. of object areas is used to distinguish between objects, it requires a large amount of calculation in image processing and a large image transfer bandwidth. Further, the appearance and color of an object may differ depending on the direction and distance of image capturing, and in this case it is difficult to identify objects as the same object based on images of the objects that are captured from different directions.

SUMMARY OF THE INVENTION

According to an aspect of the present invention, an image processing apparatus includes a holding unit configured to hold a positional relationship of a plurality of image capturing units, an acquisition unit configured to detect objects from respective images captured by the plurality of image capturing units and acquire positions of the objects on the captured images and geometric attributes of the objects, an associating unit configured to associate the detected objects, based on the positional relationship, the positions, and the geometric attributes, and an estimation unit configured to estimate a three-dimensional position of the objects based on the positional relationship and the positions of the detected objects.

Further features of the present invention will become apparent from the following description of exemplary embodiments with reference to the attached drawings.

BRIEF DESCRIPTION OF THE DRAWINGS

FIG. 15 is a block diagram illustrating an example of the functional configuration of an image processing apparatus according to a fourth exemplary embodiment.

FIG. 20 is a flow chart illustrating a process of associating a three-dimensional position candidate with an object.

DESCRIPTION OF THE EMBODIMENTS

The following describes a first exemplary embodiment of the present invention.

While a human body will be described as an example of a detection target object in the present exemplary embodiment, the present exemplary embodiment is also applicable to any other detection target objects.

Figure 3:
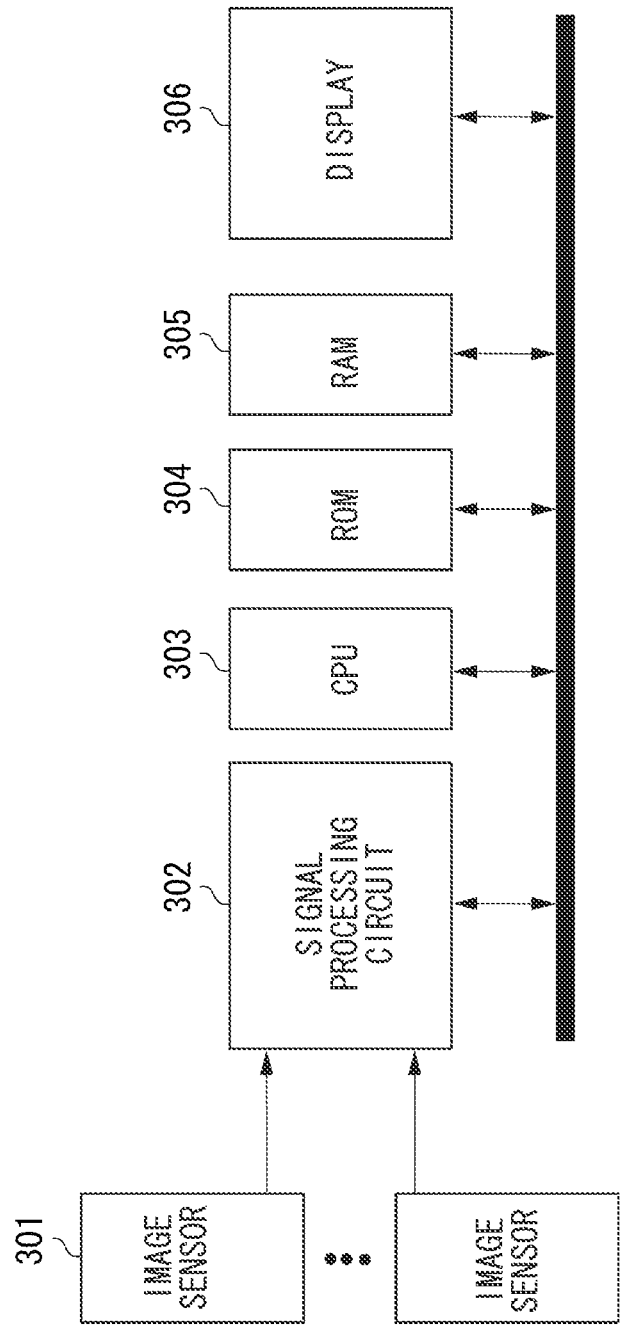
FIG. 3 illustrates the hardware configuration of an image detection apparatus according to the first exemplary embodiment.

FIG. 3 illustrates an example of the hardware configuration of an image detection apparatus according to the present exemplary embodiment.

In FIG. 3, there are two or more image sensors 301, and each of the image sensors 301 includes a charge-coupled device (CCD), a complementary metal oxide semiconductor (CMOS), etc. and converts subject images from light to electric signals. A signal processing circuit 302 processes time-series signals relating to subject images acquired from the image sensor 301 and converts the signals into digital signals. A central processing unit (CPU) 303 executes a control program stored in a read-only memory (ROM) 304 to control the entire image detection apparatus.

The ROM 304 stores the control program to be executed by the CPU 303 and various types of parameter data. The control program is executed in the CPU 303 to cause the image detection apparatus to function as various types of units that execute processing illustrated in a flow chart described below. A random access memory (RAM) 305 stores images and various types of information. Further, the RAM 305 functions as a work area of the CPU 303 and a temporary data saving area. The signal processing circuit 302, the CPU 303, the ROM 304, the RAM 305, and a display 306 are connected to each other via a bus 307.

While processing corresponding to each step in flow charts described below is realized by software using the CPU 303 in the present exemplary embodiment, a part of or the entire processing may be realized by hardware such as an electronic circuit. Further, the image detection apparatus according to the present exemplary embodiment may be realized by use of an all-purpose personal computer (PC) without the inclusion of the image sensors 301 and the signal processing circuit 302 or may be realized as a dedicated apparatus. Further, software (program) acquired via a network or various types of storage mediums may be executed by a processing apparatus (CPU, processor) such as a PC, etc.

Figure 1:
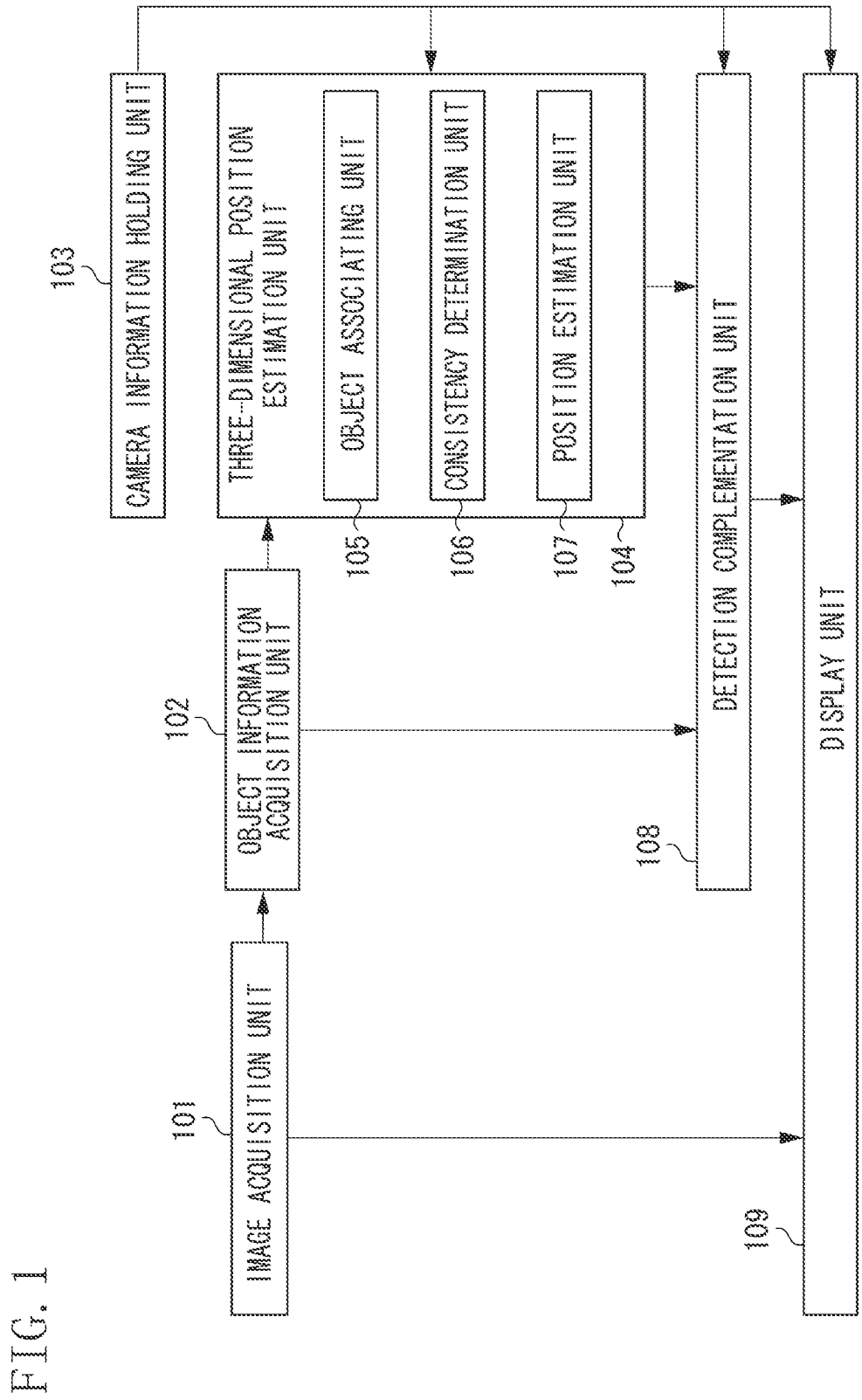
FIG. 1 illustrates the functional configuration of an image detection apparatus according to a first exemplary embodiment.
Figure 2:
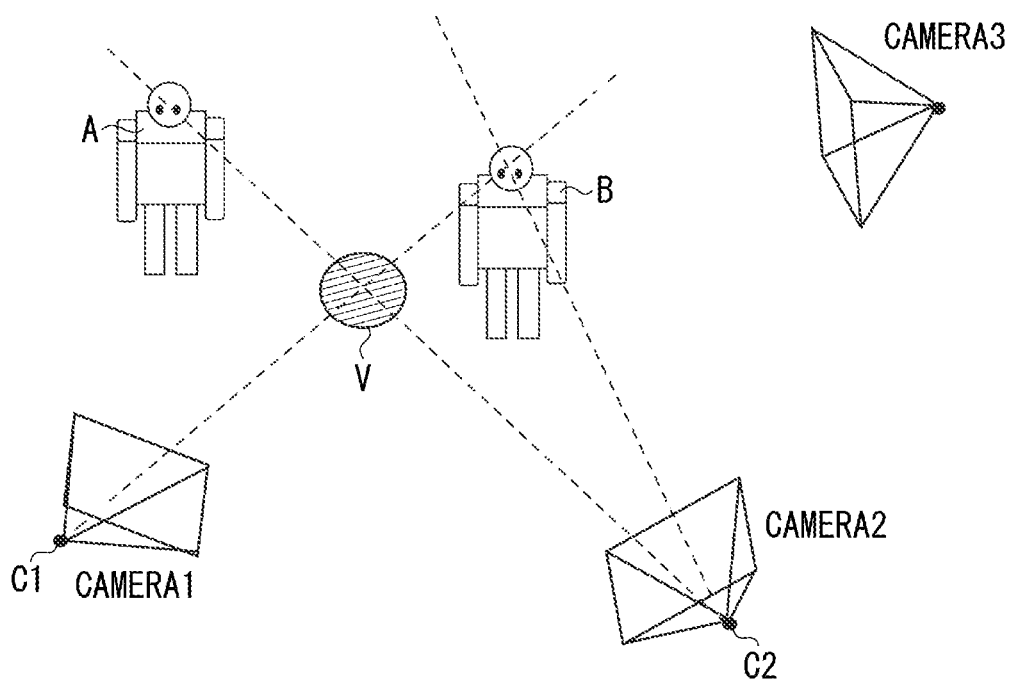
FIG. 2 illustrates a virtual image.

FIG. 1 illustrates the functional configuration of the image detection apparatus according to the present exemplary embodiment. The image detection apparatus according to the present exemplary embodiment includes an image acquisition unit 101, an object information acquisition unit 102, a camera information holding unit 103, a three-dimensional position estimation unit 104, a detection complementation unit 108, and a display unit 109.

The camera information holding unit 103 holds information about intrinsic parameters, positions, and orientations of respective cameras that are acquired by camera calibration. The image acquisition unit 101 acquires images from the respective cameras.

The object information acquisition unit 102 detects an object from each camera image (captured image) and extracts a geometric attribute. Details of the geometric attribute will be described below. The three-dimensional position estimation unit 104 estimates the three-dimensional position of the object based on the positional relationship of the cameras, a plurality of object positions, and the geometric attribute.

The three-dimensional position estimation unit 104 includes an object associating unit 105, a position estimation unit 107, and a consistency determination unit 106.

The object associating unit 105 associates the same object between the cameras.

The position estimation unit 107 estimates the coordinates of the three-dimensional position of the object based on the positions of the associated objects and the positional relationship of the cameras.

The consistency determination unit 106 determines the consistency based on the positional relationship of the cameras, the plurality of object positions, and the geometric attribute and determines whether the three-dimensional position is a virtual image.

The detection complementation unit 108 complements an object failed to be detected by the object information acquisition unit 102, based on a result of the three-dimensional position estimation unit 104.

The following describes the "complementation" performed by the detection complementation unit 108. As used herein, the term "complementation" refers to the action of estimating the three-dimensional position of an object successfully detected from a camera image of a camera and displaying on a camera image of another camera a geometric attribute of the object based on the estimated three-dimensional position.

For example, suppose that first, second, third cameras are arranged to face in the direction of an object A to attempt to simultaneously capture images of the object A and the object information acquisition unit 102 successfully detects the object A from the camera images of the first and second cameras.

There may be a case where the object A can be detected from the camera image of the third camera and also a case where the object A cannot be detected from the camera image of the third camera. A possible reason for a failure to detect the object A from the camera image of the third camera may be the presence of an obstacle between the third camera and the object A, etc.

Then, the three-dimensional position of the object A is estimated based on the positions of the object A on the respective camera images of the first and second cameras, and based on the assumption that the object A exists in the estimated three-dimensional position, a geometric attribute of the object A that is acquired from the camera image of the first or second camera is projected onto the camera image of the third camera.

By the foregoing projection, the camera image of the third camera is complemented with the geometric attribute of the object A in the case where the object information acquisition unit 102 fails to detect (is unsuccessful in detecting) the object A from the camera image of the third camera.

The display unit 109 displays on a display a result of the object detection and the three-dimensional positions with the camera images.

Figure 4:
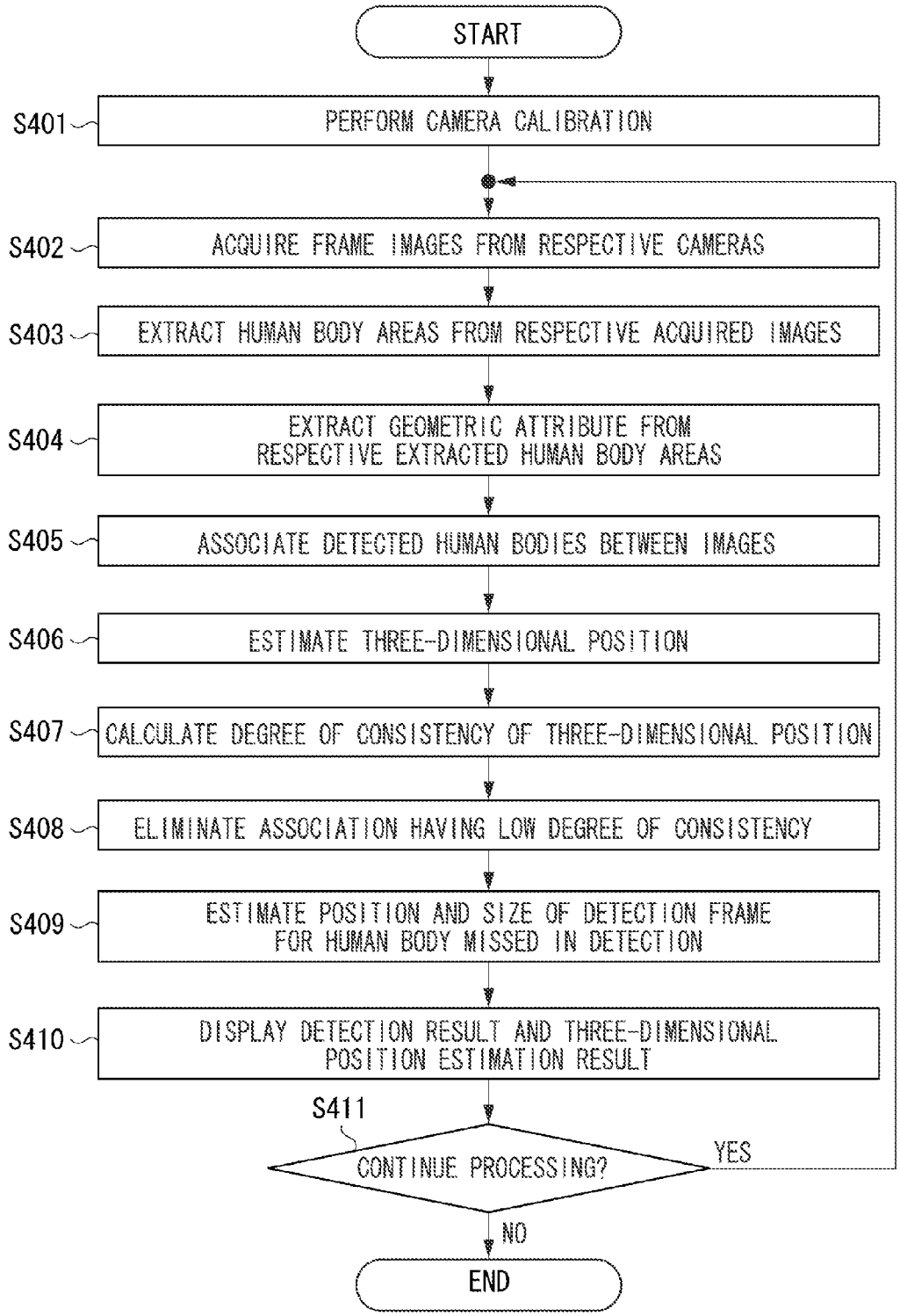
FIG. 4 is a flow chart illustrating a flow of processing according to an exemplary embodiment.

The following describes operations according to the present exemplary embodiment with reference to a flow chart illustrated in FIG. 4. In the present exemplary embodiment, four cameras having overlapping fields of view are provided. The number of cameras is not limited to four and may be any number that is two or larger.

First, in step S401, camera calibration is performed to estimate intrinsic parameters, positions, and orientations of the respective cameras. First, a calibration board is provided in the environment, and intrinsic parameters of the respective cameras are calculated using, for example, a method discussed in Zhengyou Zhang "A Flexible New Technique for Camera Calibration," IEEE Transactions on Pattern Analysis and Machine Intelligence, 22(11): 1330-1334, 2000. Further, the positions and orientations of the respective cameras are estimated with another calibration marker provided in the environment. The foregoing information is held in the camera information holding unit 103 illustrated in FIG. 1.

In the present exemplary embodiment, calibration is performed using the foregoing methods. Alternatively, the positions and orientations of the respective cameras may be estimated by extracting feature points such as corners in camera images, scale-invariant feature transform (SIFT) features, etc., associating the feature point groups between the images, and then calculating the positions and orientations of the respective cameras and the positions of the feature point groups (refer to Pierre Moulon, Pascal Monasse, and Renaud Marlet "Adaptive structure from motion with a contrario model estimation" ACCV2012). Further, the intrinsic parameters and the positions and orientations of the cameras may be calculated simultaneously.

In step S402, the image acquisition unit 101 acquires frame images from the respective cameras. In the present exemplary embodiment, since the number of cameras is four, four images are acquired.

In step S403, the object information acquisition unit 102 extracts human body areas from the respective images acquired in step S402. As a result of the processing, the coordinates (x, y) of representative points and the heights h and widths w of rectangles representing the human body areas are acquired.

In step S404, the object information acquisition unit 102 extracts from the respective human body areas extracted in step S403 geometric attributes of the respective human body areas. In the present exemplary embodiment, the sizes of the human body areas (height h and width w of detection frame) are used as the geometric attributes. Thus, the heights h and widths w of the detection frames that are acquired in step S403 are set as the geometric attributes.

In step S405, the object associating unit 105 associates the human bodies detected in step S403 between the images. Specifically, the object associating unit 105 performs a search to find out a correspondence between a human body detected in an image and a human body detected in another image.

The human bodies are associated between the images by associating the representative points of the human body areas using epipolar geometry.

Figure 5:
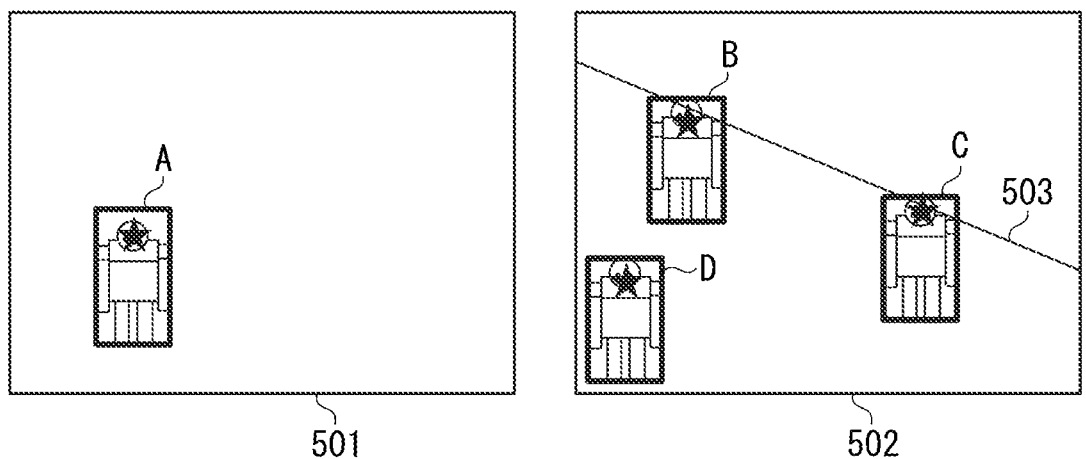
FIG. 5 illustrates an association of objects between camera images captured from different positions.

FIG. 5 illustrates an example of the respective camera images captured by the cameras 1 and 2.

For example, a straight line connecting a representative point of a human body A on a camera image 1 captured by the camera 1 (501) to an optical center (not illustrated) of the camera 1 is represented by a straight line 503 called an epipolar line on a camera image 2 (502). The epipolar line refers to a line where an epipolar plane and the camera image 1 (image plane of camera 1) intersect and a line where an epipolar plane and the camera image 2 (image plane of camera 2) intersect. The epipolar plane refers to a plane passing through three points P, C1, and C2, where P is a point in a three-dimensional space that corresponds to the representative point of the human body A on the camera image 1 (501), C1 is the optical center of the camera 1, and C2 is an optical center of the camera 2.

A fundamental matrix that is a matrix containing information about the positional relationship between the camera images 1 (501) and 2 (502) that is acquired based on the positions, orientations, and intrinsic parameters of the cameras is denoted by F. Further, a vector representing the two-dimensional coordinates of the human body A is denoted by x. Then, the epipolar line 1 is expressed by the following formula.

$$l = Fx$$

A human body is determined as a corresponding human body if the distance between a representative point of the human body and the epipolar line is equal to or smaller than a threshold value. For example, in FIG. 5, human bodies on the camera image 2 (502) that correspond to the human body A on the camera image 1 (501) are human bodies B and C. The distance between a representative point of a human body D on the camera image 2 (502) and the epipolar line 503 is beyond the threshold value, so it is determined that the human body D on the camera image 2 (502) does not correspond to the human body A on the camera image 1 (501). The number of human bodies on another camera that correspond to a human body is required to be one per camera. Thus, pairs of associated human bodies are acquired to satisfy the foregoing requirement. Pairs {A, B} and {A, C} are generated as pairs of the human body A on the camera image 1 (501) and a human body associated with the human body A in FIG. 5.

In step S406, the position estimation unit 107 estimates the three-dimensional position based on the pairs of associated human bodies acquired in step S405.

Figure 6:
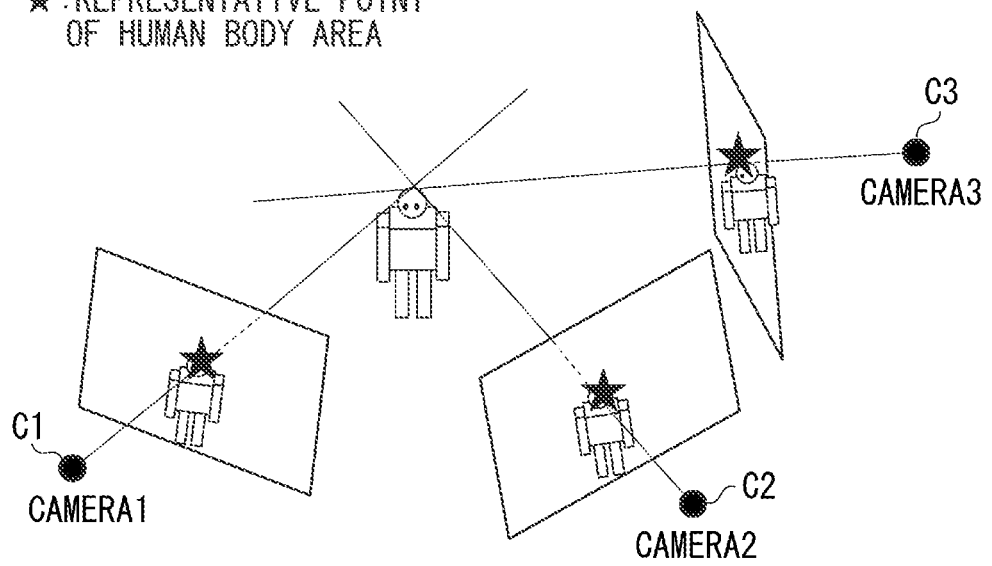
FIG. 6 illustrates the three-dimensional position estimation.

First, as illustrated in FIG. 6, respective straight lines in the three-dimensional space that pass through optical centers C1, C2, and C3 of cameras and representative points of human body areas on camera images of the cameras are acquired. The straight lines are acquired based on the positions, orientations, and intrinsic parameters of the cameras and the coordinates of the representative points on the images. Next, an intersection point of the straight lines of the respective cameras is acquired and set as the three-dimensional position of the human body. There may be a case where the straight lines do not interest at a single point due to estimation errors in the straight lines. In this case, a point at which the sum of the distances from the respective straight lines is minimal is used in place of the intersection point.

In step S407, the consistency determination unit 106 calculates the degree of consistency of the three-dimensional position based on the positions, orientations, and intrinsic parameters of the cameras and the geometric attributes acquired in step S404. A higher degree of consistency indicates a higher possibility that the image is not a virtual image but a real image, and the reliability of the three-dimensional position is high.

The consistency determination unit 106 first generates in the three-dimensional position acquired in step S406 a cylindrical image having an average size (width, height) of a human body that is predefined.

Figure 7A:
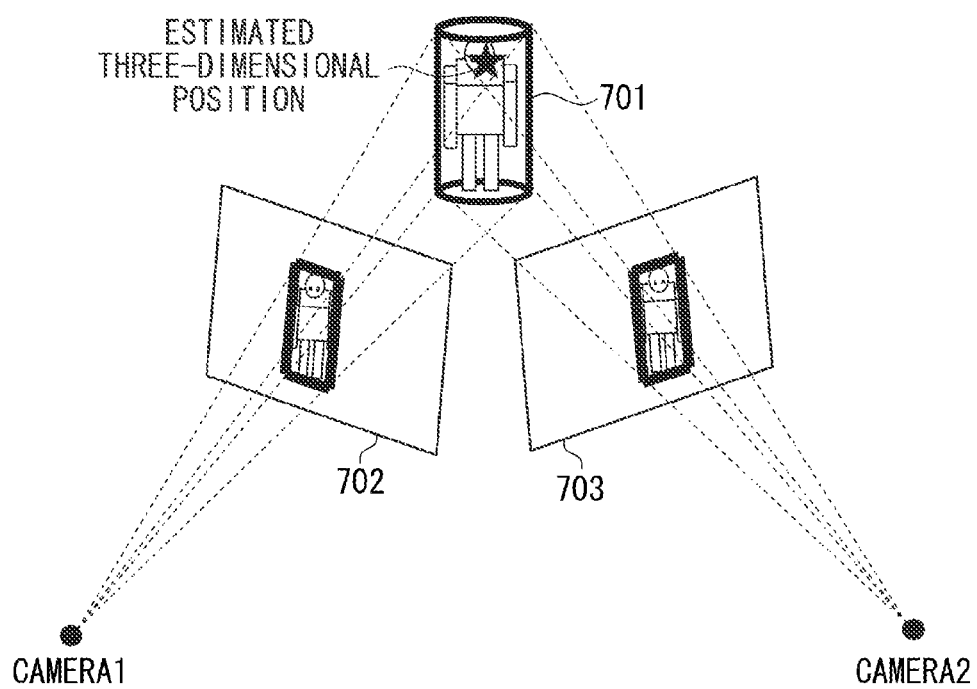
FIGS. 7A and 7B illustrate the determination of whether an object is a virtual image based on the size of the object in a case where the object is a real image.
Figure 7B:
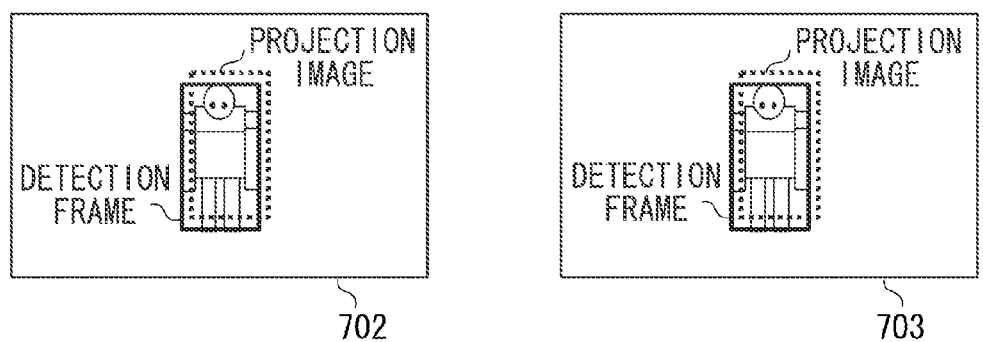

The illustration in FIG. 7A shows that the position (estimated three-dimensional position) of a generated cylindrical image 701 corresponds to the actual position of the human body. Next, the consistency determination unit 106 projects the cylindrical image 701 onto camera images 702 and 703. At this time, when the estimated three-dimensional position is correct as illustrated in FIG. 7A, the cylindrical image is present at a correct distance from the cameras, so the sizes of the images (projection images) projected on the camera images 702 and 703 are similar to the sizes of detection frames as illustrated in FIG. 7B.

Figure 8A:
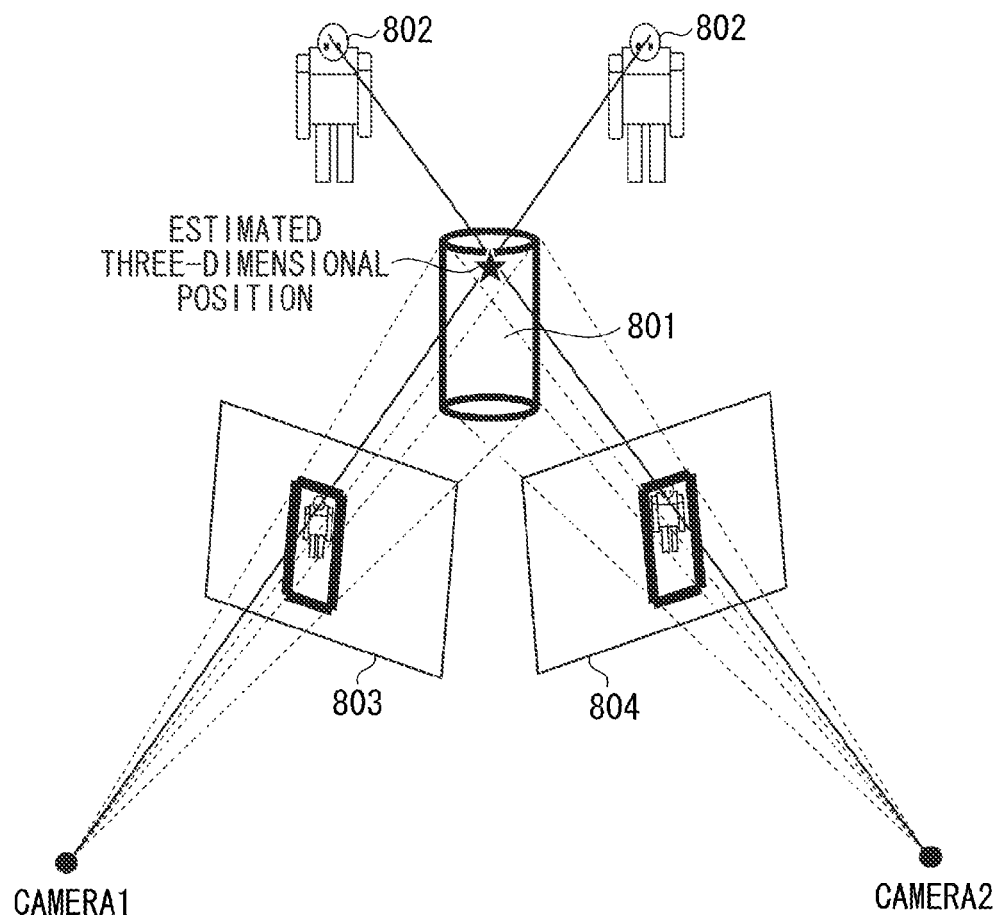
FIGS. 8A and 8B illustrate the determination of whether an object is a virtual image based on the size of the object in a case where the object is a virtual image.
Figure 8B:
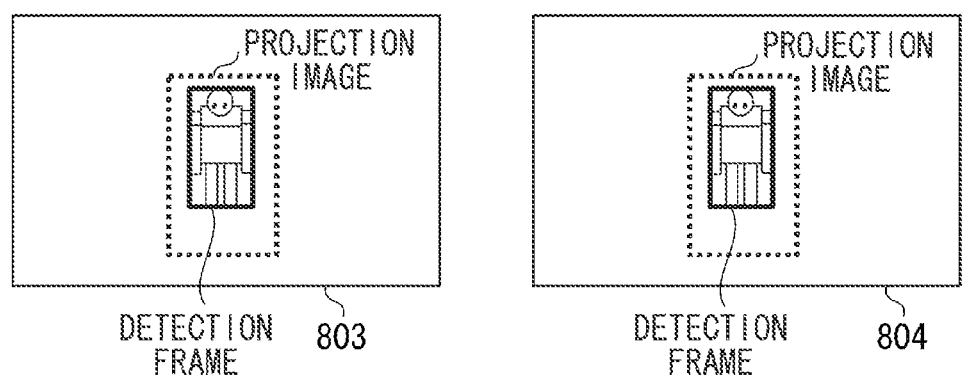

On the other hand, when the estimated three-dimensional position is incorrect as illustrated in FIG. 8A, the distances from the respective cameras to the estimated three-dimensional position are different from the actual distances from the respective cameras to a human body 802. Thus, the sizes of images (projection images) projected on camera images 803 and 804 are not similar to the sizes of detection frames as illustrated in FIG. 8B. In FIG. 8B, the sizes of the images projected on the camera images 803 and 804 are larger than the sizes of the detection frames because it is estimated that the estimated three-dimensional position is closer to the camera than the actual position of the human body 802.

Thus, in the present exemplary embodiment, the degree of similarity between the sizes (height h, width w) of a projection image and a detection frame is used as the degree of consistency of the three-dimensional position calculated from the camera image. While the overlapping ratio between a detection frame and a projection image is used as the degree of consistency in the present exemplary embodiment, any other indexes such as the ratio between the heights of a detection frame and a projection image, etc. may be used as the degree of consistency.

The degree of consistency R of the three-dimensional object that takes all the camera images into consideration is a minimum value of the degrees of consistency $r_c$ that are calculated from the respective camera images, as expressed by the following formula.

$$R = \min_c r_c$$

In this formula, c is the number of a camera image, and $r_c$ is the degree of consistency that corresponds to the camera image. A method for the calculation of the degree of consistency R is not limited to the foregoing method and the calculation may be performed by any other method such as a method using a mean value, or the like.

In step S408, the consistency determination unit 106 eliminates an object association between the camera images that has a low degree of consistency, based on the degree of consistency R acquired in step S407. Specifically, an association having a lower degree of consistency than a predefined threshold value is eliminated.

In step S409, the detection complementation unit 108 estimates the position and size of a detection frame for a human body failed to be detected in step S403 by use of a result of the three-dimensional position estimation performed in step S406.

Figure 9:
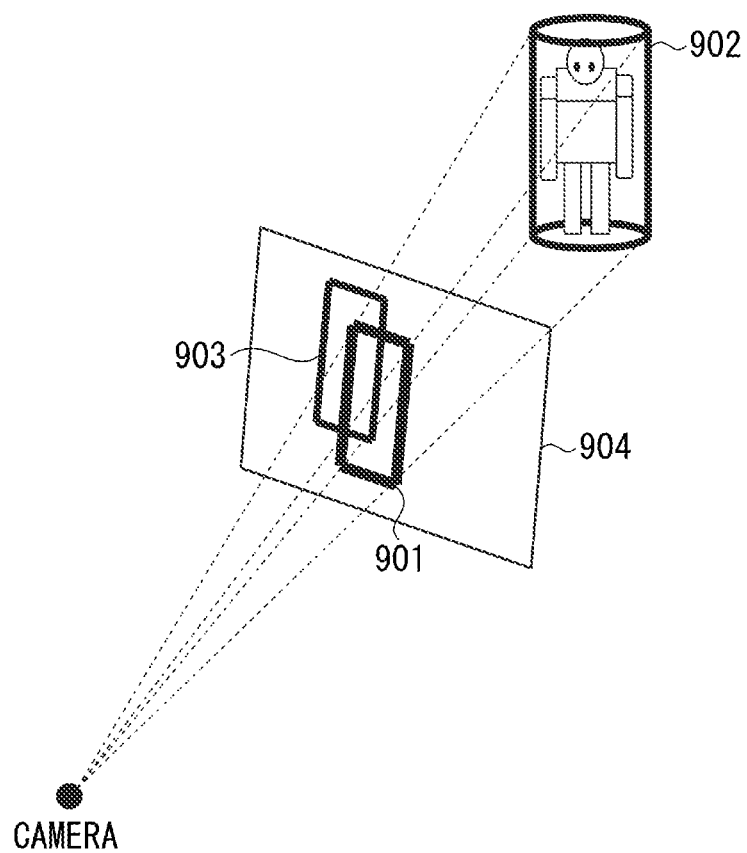
FIG. 9 illustrates a method of re-detecting an object failed to be detected.

First, as illustrated in FIG. 9, the detection complementation unit 108 projects onto an arbitrary camera image 904 a cylindrical image 902 generated in the three-dimensional position by a procedure similar to that in step S407.

At this time, if a human body area 903 acquired in step S403 exists in the vicinity of a projection image 901, the detection complementation unit 108 determines that the projection image 901 is already detected and discards the projection image 901.

On the other hand, if the human body area 903 acquired in step S403 does not exist in the vicinity of the projection image 901, the detection complementation unit 108 adopts the image as a human body failed to be detected. Whether the human body area acquired in step S403 is in the vicinity of the projection image is determined based on whether the overlapping ratio between the areas is not below a predefined threshold value.

In step S410, the display unit 109 displays on a display device the detection result and the three-dimensional position estimation result that are acquired in the foregoing processing.

Figure 11:
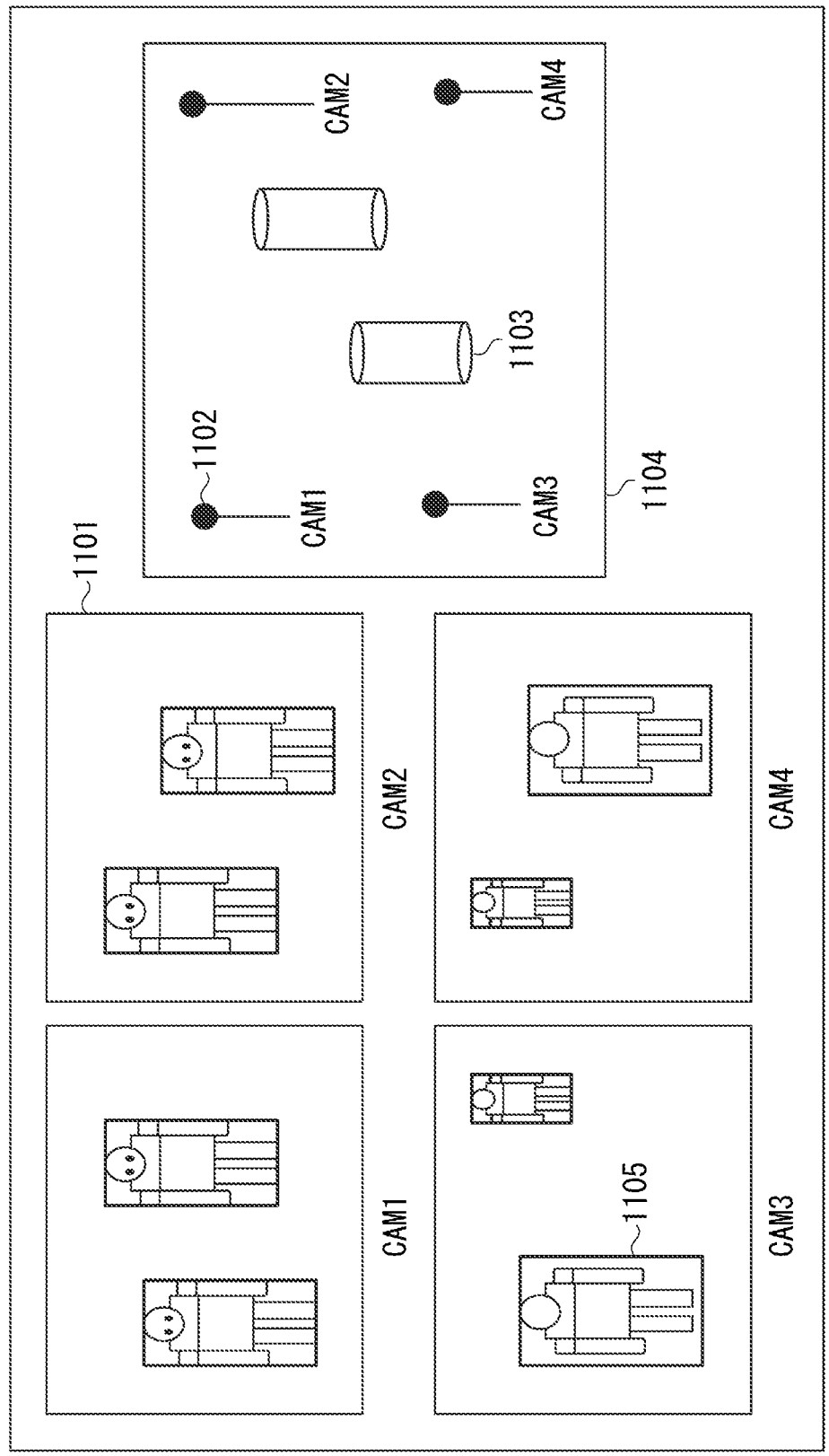
FIG. 11 illustrates a display screen.

FIG. 11 illustrates an example of the configuration of a displayed screen. The example of the configuration of the displayed screen includes one or more camera images 1101 and a three-dimensional map 1104. The display unit 109 includes an image display unit and a map display unit that draw the camera image 1101 and the three-dimensional map 1104, respectively.

On the camera image 1101, symbols (frames) indicating the human body areas detected in steps S403 and S409 are superimposed on the captured images. The frames of the same person on different cameras are specified in the same color so that the user can recognize with ease whether human bodies on different cameras are the same human body.

On the three-dimensional map 1104, a symbol 1103 indicating the three-dimensional position and size of a human body and a symbol 1102 indicating the position and direction of a camera as well as a floor surface are displayed as a three-dimensional image. A human body on the camera image 1101 and a human body on the three-dimensional map 1104 are specified in the same color so that the user can recognize with ease whether the human bodies are the same human body.

While colors are used to indicate whether persons are the same person in the present exemplary embodiment, a unique number, character, symbol, etc. of a person may be superimposed to increase visibility. Further, while the three-dimensional map 1104 is shown as a three-dimensional map in the present exemplary embodiment, a two-dimensional map may be used. Use of a three-dimensional map exerts an effect of acquiring the position of the human body in the height direction as well as the position of the human body on the floor surface. In a case where a head portion of the human body is used as a reference for the position of the human body, the body height can also be acquired. Further, use of a two-dimensional map exerts an effect of making it easy to visually recognize the position of the human body on the floor surface.

Further, the viewpoint of the three-dimensional map 1104 may be fixed, or a mechanism by which the user can change the viewpoint may be provided. Further, items that can be displayed on the three-dimensional map 1104 are not limited to those described above, and a layout diagram showing the layout of furniture, etc. may be superimposed on the floor surface, or a three-dimensional object may be superimposed. This exerts an effect of showing the positional relationship between the human body and a nearby object, in an easy-to-understand way.

In step S411, whether to continue the processing is determined. If a further image is obtainable from the camera images (YES in step S411), the processing returns to step S402. On the other hand, if no further image is obtainable from the camera images (NO in step S411), the processing is ended.

While the image having the average size of the human body is generated in the three-dimensional position calculated in step S406 to generate the image in step S407, any other method may be used.

Figure 10A:
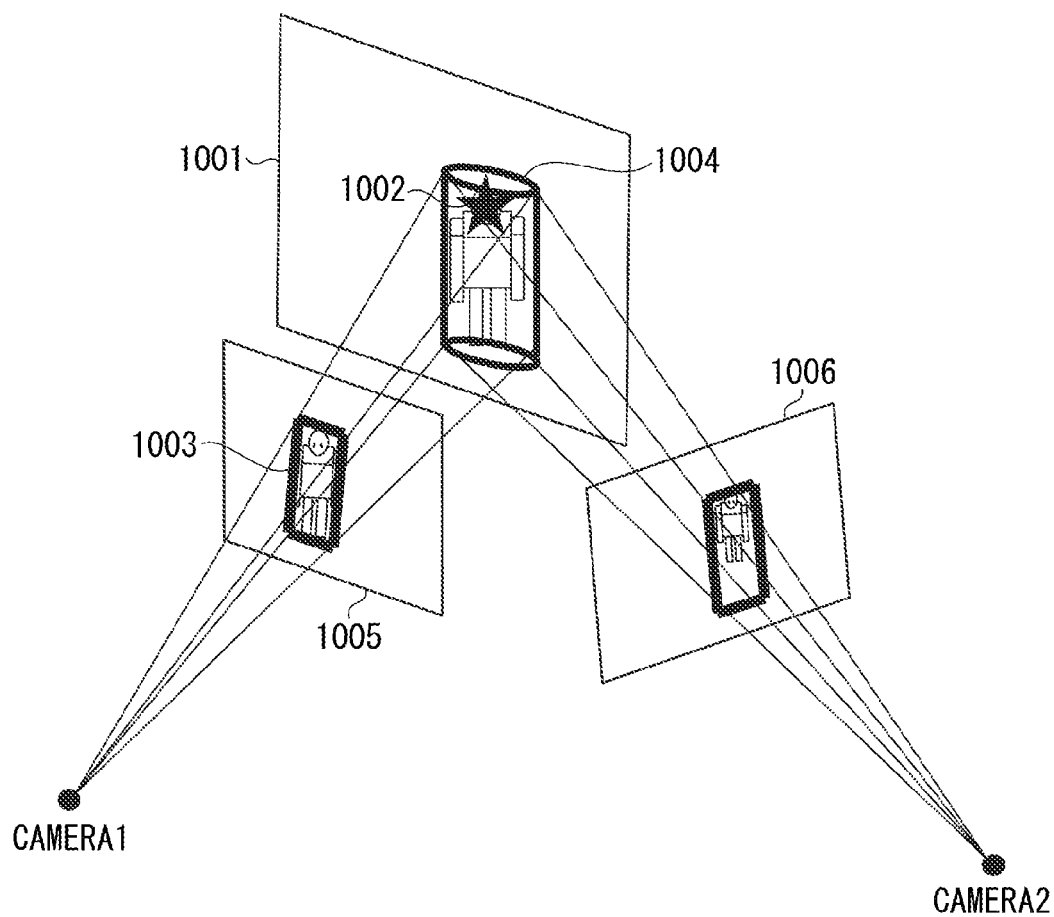
FIGS. 10A and 10B illustrate a method of generating an image based on human body area.
Figure 10B:
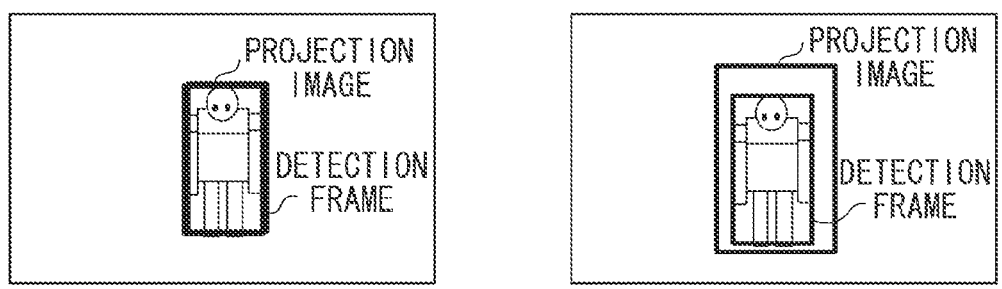

For example, as illustrated in FIG. 10A, an arbitrary camera image plane 1005 is selected, and a plane 1001 parallel to the camera image plane 1005 is placed to pass through an estimated three-dimensional position 1002 and a human body area 1003 is projected onto the plane 1001. Then, the height and width of the plane image projected on the plane 1001 are acquired, and a cylindrical image 1004 having the acquired height and diameter may be used in place of the cylindrical image generated in step S407. Then, like the real image 701 in FIG. 7 and a virtual image 801 in FIG. 8, the image 1004 is projected onto the respective camera images. In FIG. 10A, the image 1004 is projected onto the camera image planes 1005 and 1006. An example of projection images is illustrated in FIG. 10B. The image projected on the camera 1 is a projection of the image 1004 generated from the human body area 1003 on the camera image plane 1005, so regardless of whether the estimated three-dimensional position is a virtual image, the detection frame coincides with the projection image. On the other hand, as to the camera 2, the size of the image projected on the camera 2 does not coincide with the size of the detection frame on the camera 2 in a case where the estimated three-dimensional position is a virtual image, whereas the sizes coincide in a case where the estimated three-dimensional position is a real image. Thus, as in step 407 described above, after the degree of similarity in size between the projection image and the detection frame on each camera image is calculated, the degree of consistency R of the three-dimensional object that takes all the camera images into consideration is calculated using a method similar to that related to the formula (as described above):

$$R = \min_c r_c$$

While only two cameras are illustrated in FIG. 10, in a case where there are three or more cameras, the image 1004 is projected onto each camera image and the degree of consistency R is calculated as described above. While the arbitrary camera image plane 1005 is selected and the degree of consistency R is calculated in FIG. 10, each of the camera image planes may be selected and the degrees of consistency of the respective camera image planes may be calculated to calculate and use the average value of the calculated degrees of consistency as the degree of consistency R. Generating the images by the foregoing method makes it unnecessary to assume the average size of a human body, so the accuracy is expected to increase in a case where the actual size of the human body is significantly different from the average size.

In step S407, after the image is generated, the images projected on the respective camera images are compared with the detection frames to obtain the degrees of consistency. Alternatively, the degree of consistency may be calculated by generating the images described above as illustrated in FIG. 10 on a plurality of camera images and then comparing the images on the three-dimensional space. A specific procedure is as follows. First, images as illustrated in FIG. 10 are generated on the plurality of camera images by the method described above. Next, the overlapping ratio $r_{ij}$ between the images of arbitrary cameras i and j is calculated. Then, the degree of consistency R that takes all the cameras into consideration may be calculated by the following formula.

$$R = \min_{i,j} r_{ij}$$

In this way, the sizes can be compared on the three-dimensional space, whereby the sizes can be compared regardless of a difference in intrinsic parameters such as viewing angles, focal lengths, etc. of the respective cameras. A method for the calculation of the degree of consistency R that takes all the cameras into consideration is not limited to the foregoing method, and the degree of consistency R may be calculated using any other method such as a method using an average value, or the like.

While the object information acquisition unit 102 extracts the position and geometric attribute of the object on the image in the present exemplary embodiment, the processing performed in the image detection apparatus may be distributed to a plurality of apparatuses and realized as an image processing system. Further, the processing collectively described as a single function block may be distributed to a plurality of function blocks.

For example, the object extraction may be performed outside the object information acquisition unit 102, and the object information acquisition unit 102 may extract the position and geometric attribute of the object on the image from an external apparatus via a communication link.

More specifically, for example, the cameras are provided with a transmission unit and an object detection unit configured to extract the position and geometric attribute of an object on an image from the captured image. Alternatively, a PC connected to the cameras is provided with a transmission unit and an object detection unit configured to extract the position and geometric attribute of an object on an image from the captured image.

Then, the object information acquisition unit 102 may acquire the information from the cameras or the PC via a communication link such as a network, or the like established between the transmission unit of the cameras or the PC and a reception unit of the image detection apparatus.

Figure 14A:
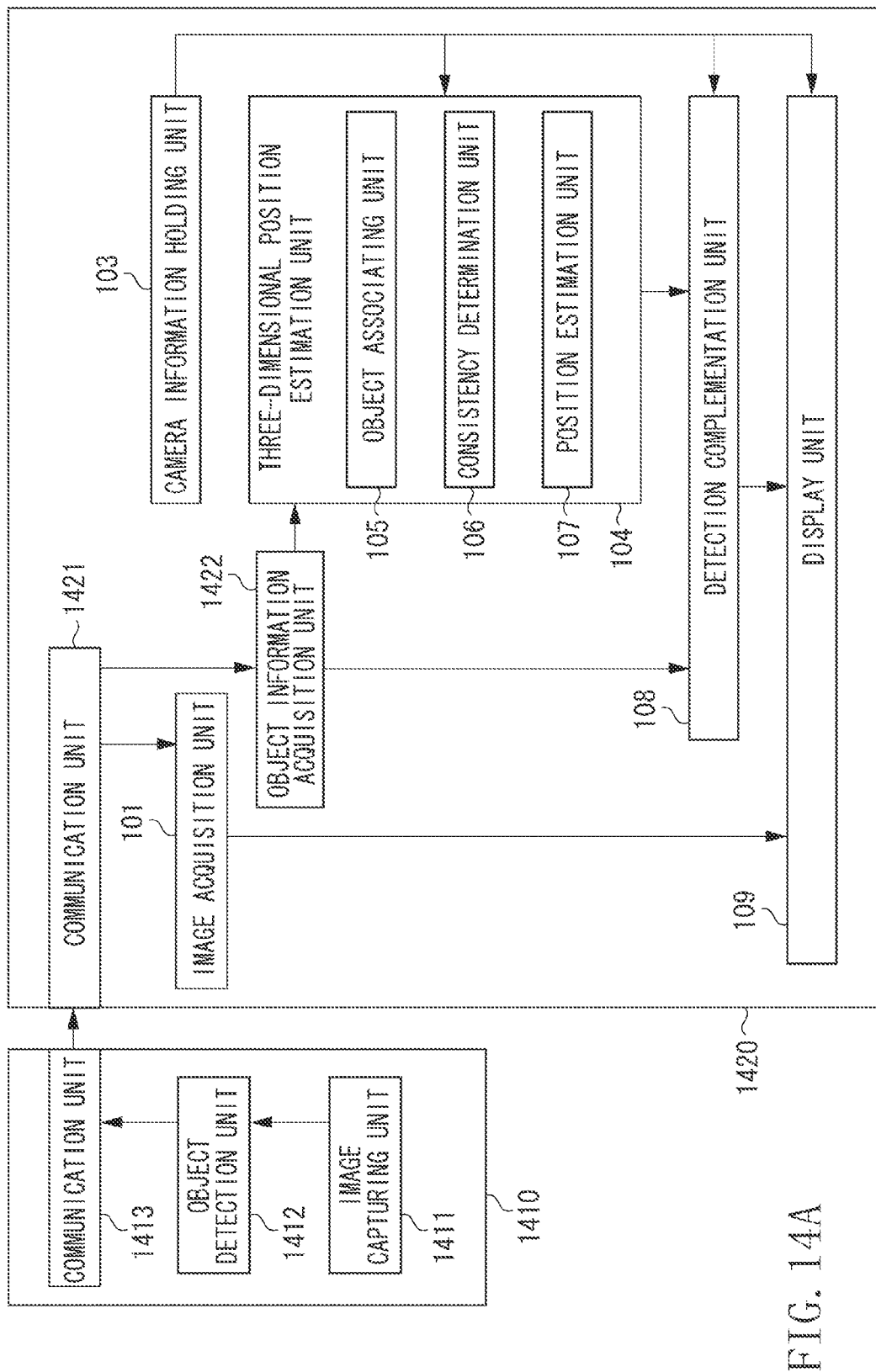
FIGS. 14A and 14B each illustrate the functional configuration of another image detection apparatus.

FIG. 14A illustrates an example in which a camera 1410 and an image detection apparatus 1420 establish a communication link. The camera 1410 includes an image capturing unit 1411, an object detection unit 1412, and a communication unit 1413. The image detection apparatus 1420 includes the units 101 and 103 to 109 described above, a communication unit 1421, and an object information acquisition unit 1422. While the object information acquisition unit 102 illustrated in FIG. 1 detects an object from a camera image and extracts a geometric attribute, the object information acquisition unit 1422 neither detects an object from a camera image nor extracts a geometric attribute.

The object detection unit 1412 detects an object. The object information acquisition unit 1422 acquires the position and geometric attribute of the object via the communication link established between the communication unit 1413 and the communication unit 1421.

Figure 14B:
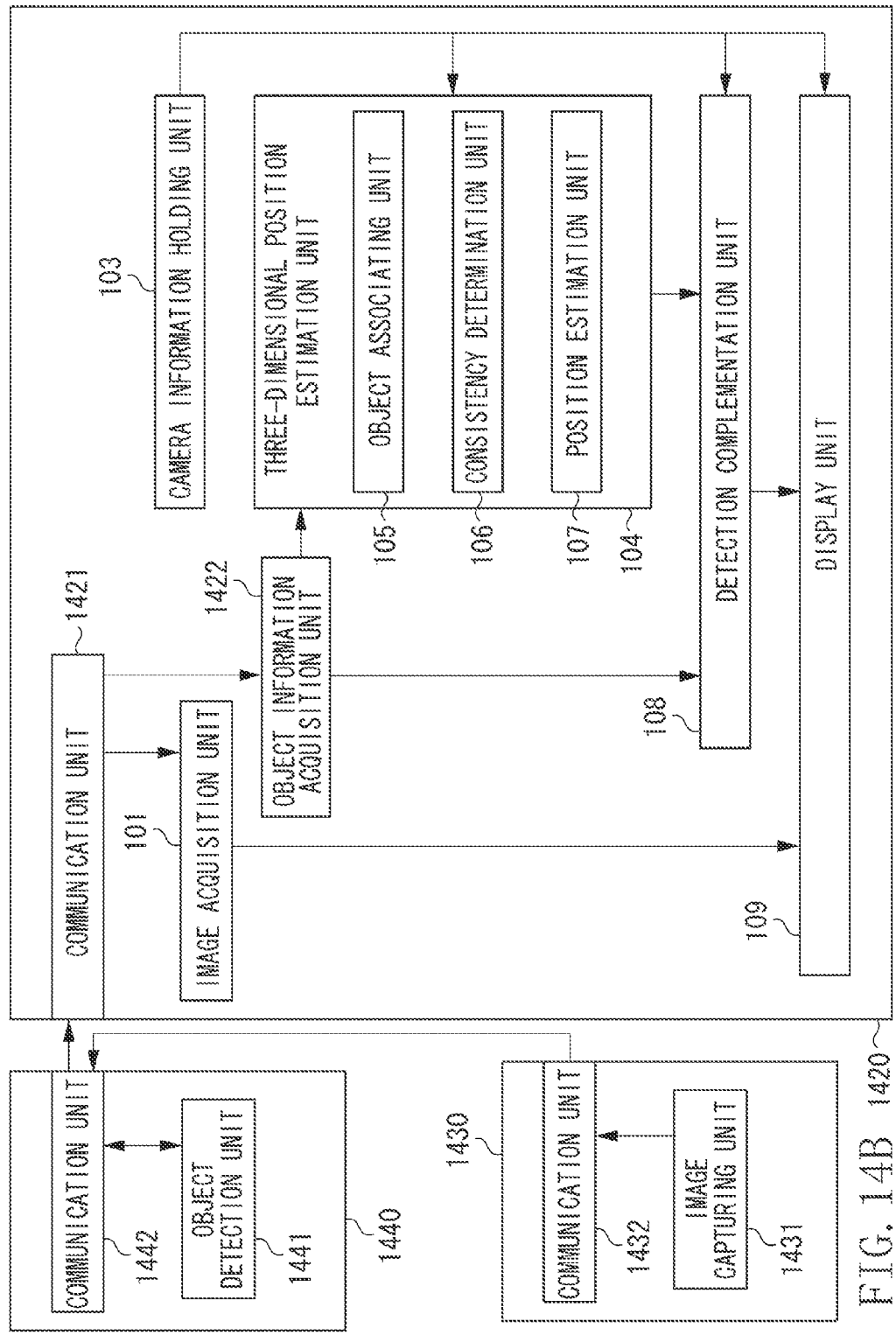

FIG. 14B illustrates an example in which a PC 1440 and the image detection apparatus 1420 establish a communication link. A camera 1430 and the PC 1440 are connected by wire using, for example, a universal serial bus (USB) cable, or the like, and the PC 1440 may receive image data from the camera 1430 via the wired connection or via a storage medium (not illustrated). Then, the object information acquisition unit 1422 of the image detection apparatus 1420 acquires the position and geometric attribute of the object via the communication link established between a communication unit 1442 of the PC 1440 and the communication unit 1421 of the image detection apparatus 1420.

Further, the PC may include an object information acquisition unit to perform the three-dimensional position estimation in the PC, or the camera may include an object information acquisition unit to include the three-dimensional position estimation function in the camera.

Only the position and geometric attribute are transmitted via the communication link to exert an effect of reducing the amount of transmission, compared to the cases where images are transmitted. Further, the processing for extracting the position and geometric attribute of an object on an image and other processing are executed by different pieces of hardware. This is expected to exert an effect of distributing the processing and also an effect of reducing the processing load on the respective pieces of hardware. Further, the camera includes the object information acquisition unit to include the three-dimensional position estimation function in the camera to exert an effect of being able to omit the PC configured to perform the three-dimensional position estimation.

As in the present exemplary embodiment, the three-dimensional position estimation is performed using the positional relationship of the cameras and the positions and geometric attributes (size of human body) of the plurality of objects so that an effect of eliminating a virtual image is expected to be exerted. It can especially be expected to exert an effect of efficiently eliminating a virtual image existing at a wrong distance from the cameras.

Use of the positions and orientations of the cameras enables accurate comparison of geometric attributes between the cameras regardless of the image capturing direction and distance of the object, so the accuracy of the discrimination of whether objects on first and second camera images are the same object can be expected to increase. Use of the size of the human body as the geometric attribute requires a small amount of calculation for the attribute extraction, so it can be expected to exert an effect of efficiently eliminating a virtual image with a small amount of calculation.

Further, the capacity to store the geometric attribute is small, so it can be expected to exert an effect of efficiently eliminating a virtual image with a small storage capacity and a small amount of transmission, compared to the cases of images and image features.

In the first exemplary embodiment, the size of a human body area is used as a geometric attribute. Alternatively, the direction of a human body may be used as the geometric attribute as described below in the following second exemplary embodiment.

The present exemplary embodiment is different from the first exemplary embodiment only in the processing of steps S404 and S407 in FIG. 4, so only the processing of steps S404 and S407 will be described below.

In step S404, the object information acquisition unit 102 extracts from the human body area extracted in step S403 the geometric attribute of the human body area. While the size of the human body area is used as the geometric attribute in the first exemplary embodiment, the direction of the human body that is extracted from the human body area is used as the geometric attribute in the present exemplary embodiment.

Figure 12:
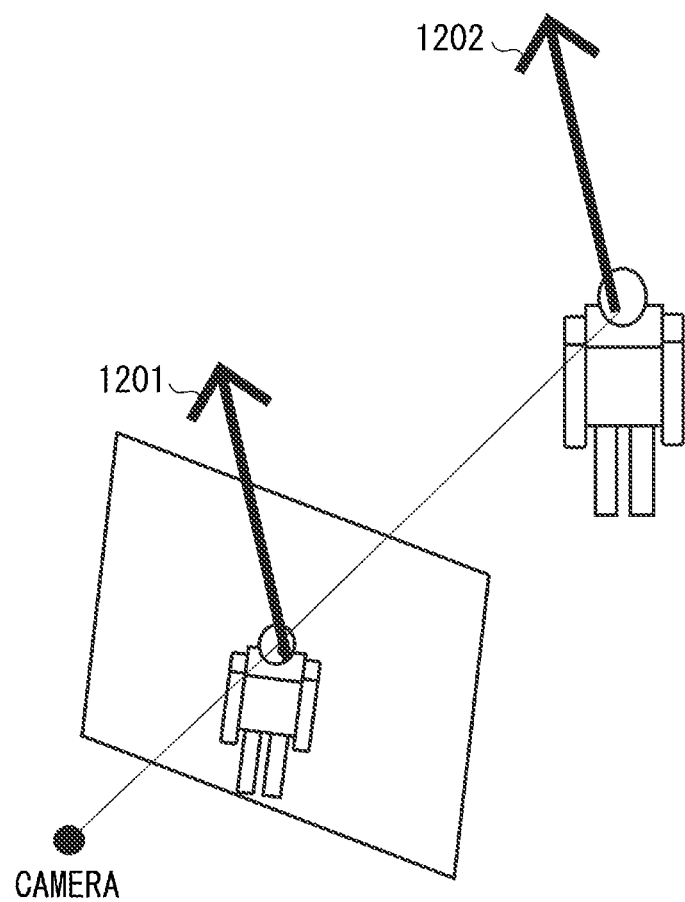
FIG. 12 illustrates the extraction of the direction (facing direction of a human body) or motion direction of a human body.

Specifically, as illustrated in FIG. 12, a direction vector 1201 parallel to a direction 1202 of the human body is estimated, and the direction vector 1201 is used as the geometric attribute. The direction vector is three-dimensional, and the norm is normalized to 1.

To extract the direction vector, a human body direction classifier that is learned in advance can be used. A method such as a parametric eigenspace method is applicable as a method for classifying the direction of an object, and any other method is also applicable. The human body direction classifier is applied to the human body area extracted in step S403 to obtain a direction vector. At this time point, the direction vector is expressed not in a world coordinate system but in a camera coordinate system.

In step S407, the consistency determination unit 106 determines the consistency of the three-dimensional position based on the positions, orientations, and intrinsic parameters of the cameras and the geometric attribute acquired in step S404.

First, a method will be described below in which the degree of consistency r between two cameras is calculated by comparing a direction vector of a camera image with a direction vector of another camera image. Since the direction vectors are calculated in the camera coordinate system, the direction vectors are to be converted into the same coordinate system, in order to compare the direction vectors. Thus, in the present exemplary embodiment, the direction vectors expressed in the camera coordinate system are converted into the world coordinate system.

Since the positions, orientations, and intrinsic parameters of the cameras are already known, the consistency determination unit 106 can acquire a matrix for the conversion from the camera coordinate system into the world coordinate system. This conversion matrix is applied to the direction vectors in the camera coordinate system to acquire direction vectors in the world coordinate system.

Next, the consistency determination unit 106 compares the direction vector of a camera in the world coordinate system with the direction vector of another camera in the world coordinate system to calculate the degree of consistency r between the two cameras.

Figure 13:
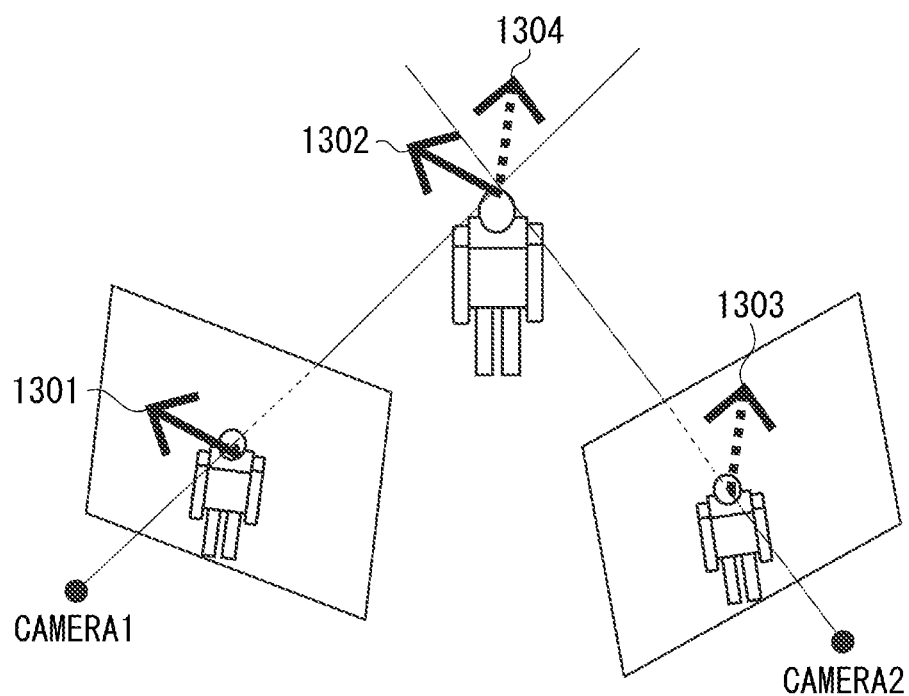
FIG. 13 illustrates the comparison of the direction (facing direction of a human body) or motion direction of a human body.

For example, in FIG. 13, a direction vector 1302 extracted from a camera image of the camera 1 is compared with a direction vector 1304 extracted from a camera image of the camera 2. The direction vector 1302 in FIG. 13 is a direction vector 1301 moved parallel, so the direction vectors 1301 and 1302 represent the same vector. Further, the direction vector 1304 is a direction vector 1303 moved parallel, so the direction vectors 1303 and 1304 represent the same vector. The comparison between the vectors is performed based on the degree of cosine similarity. The degree of cosine similarity between vectors p and q is calculated by the following formula.

$$\cos(p, q) = \frac{p \cdot q}{|p||q|}$$

Next, the degree of consistency R that takes all the cameras into consideration is calculated. Based on the degree of consistency $r_{ij}$ calculated for arbitrary cameras i and j, the degree of consistency R that takes all the cameras into consideration is calculated using the following formula.

$$R = \min_{i,j} r_{i,j}$$

A method of calculating the degree of consistency R that takes all the cameras into consideration is not limited to the foregoing method, and any other method such as a method using an average value, or the like may be used.

While the direction vector is a three-dimensional vector with the norm normalized to 1 and the degree of freedom of the direction of the human body is 2 in the present exemplary embodiment, the degree of freedom may be 1. A case where the degree of freedom of the direction of the human body is 1 is a case of, for example, the direction of the human body that only takes the yaw rotation around a vertical straight line into consideration. In this case, a direction vector having a component of the vertical direction that is 0 in the camera coordinate system may be extracted. Further, the degree of freedom of the direction of the human body may be 3, and the pitch, yaw, and roll rotations may be taken into consideration. In this case, the pitch angle and the yaw angle may be represented by the directions of the vectors, and the roll angle may be represented by the norm of the vector.

While the vectors are used as the geometric attribute representing the direction of the human body in the present exemplary embodiment, the geometric attribute is not limited to the vectors. For example, the geometric attribute representing the direction of the human body may be represented by a combination of rotation angles or a quaternion.

While the object detection in step S403 and the object attribute extraction in step S404 are performed by different classifiers in the present exemplary embodiment, the object detection and the object attribute extraction may be performed by the same classifier. Specifically, a classifier called a multiclass classifier configured to classify a plurality of types of classes may be used to simultaneously perform the human body detection and the direction classification. For example, a classifier configured to classify a non-human body (background), a human body of a direction 1, a human body of a direction 2, . . . , and a human body of a direction N is prepared. The classifier is applied to a partial image acquired from a camera image by a sliding window protocol to determine whether the partial image is the non-human body (background), the human body of the direction 1, the human body of the direction 2, . . . , or the human body of the direction N. Use of the same classifier to perform the object detection and the object attribute extraction is expected to exert an effect of decreasing the amount of processing, compared to the case where different classifiers are used to perform the object detection and the object attribute extraction.

As in the present exemplary embodiment, the three-dimensional position estimation is performed using the positional relationship of the cameras and the positions and geometric attributes (direction of human body) of a plurality of objects so that an effect of eliminating a virtual image is expected to be exerted. Especially, an effect of effectively eliminating a virtual image estimated from a human body area having a contradictory direction of the human body is expected to be exerted. Use of the positions and orientations of the cameras enables accurate comparison of the geometric attribute between different cameras regardless of the object image capturing direction and the distance, and the accuracy of the discrimination of whether the objects are the same object can be expected to increase. Further, the capacity to store the geometric attribute is small, so it can be expected to exert an effect of efficiently eliminating a virtual image with a small storage capacity and a small amount of transmission, compared to the cases of images and image features.

In the first exemplary embodiment, the size of a human body area is used as the geometric attribute. Alternatively, the motion of an object may be used as the geometric attribute as described below in the following third exemplary embodiment. The motion of an object refers to, for example, the movement direction, the amount of change in size of an object area, and the velocity or acceleration.

First, the following describes an exemplary embodiment in which the movement direction of the human body area is used as the geometric attribute of the motion of the human body. The present exemplary embodiment is different from the first exemplary embodiment only in the processing of steps S404 and S407 in FIG. 4, so only the processing of steps S404 and S407 will be described below.

In step S404, the object information acquisition unit 102 extracts from the human body area extracted in step S403 the geometric attribute of the human body area. In the present exemplary embodiment, the movement direction of the human body is used as the geometric attribute.

Specifically, as illustrated in FIG. 12, the movement direction vector 1201 parallel to the movement direction 1202 of the human body is estimated and used as the geometric attribute. The movement direction vector is three-dimensional, and the norm is normalized to 1.

To extract the movement direction vector, first, object tracking is applied to video frames to associate a current human body area with a past human body area of the same person. Object tracking is a method of tracking the same object across a plurality of frames, and examples thereof include a method discussed in M. D. Breitenstein et al., "Robust tracking-by-detection using a detector confidence particle filter", ICCV2009. In the present exemplary embodiment, the position and size of the human body area in the current frame and the position and size of the human body area in the tenth previous frame are acquired by object tracking.

Next, a movement direction vector is extracted from the foregoing. In a case where the focal lengths of the cameras and the size of the object in the three-dimensional space are known, the three-dimensional position of the object can be estimated based on the position and size of the object area on the images. As to the size of the object in the three-dimensional space, an average height and an average width of a human body that are calculated in advance are used. The movement direction vector is calculated by subtracting the three-dimensional position calculated in the past frame from the three-dimensional position extracted from the current frame.

In step S407, the consistency determination unit 106 determines the consistency of the three-dimensional position based on the positions, orientations, and intrinsic parameters of the cameras and the geometric attribute acquired in step S404. Details of the processing are similar to those of the comparison between the direction vectors in the second exemplary embodiment.

While the movement direction vector is calculated in the three-dimensional space in the present exemplary embodiment, the movement direction vector may be calculated on a camera image plane. Specifically, the movement direction vector may be calculated by subtracting the coordinates of the position of the human body area on the image of the past frame from the coordinates of the position of the human body area on the image of the current frame. Since the size of the object in the three-dimensional space is not used, the movement direction can be used in the consistency determination even in a case where the size is unknown or a case where the accurate size cannot be acquired.

A method for the extraction of the movement direction of the human body is not limited to the foregoing method, and any other method may be used. For example, the movement direction may be calculated based on an optical flow. Further, based on the assumption that the human body direction and the movement direction are the same, the human body direction as described in the second exemplary embodiment may be used in place of the movement direction.

Use of the movement direction and the human body direction in combination makes it possible to use one of the movement direction and the human body direction that is more reliable in a case where stable extraction of the movement direction is not possible because the distance of the subject is far, or the like. This is expected to increase the accuracy.

As in the present exemplary embodiment, the three-dimensional position estimation is performed using the positional relationship of the cameras and the positions and geometric attributes (motion direction of human body) of a plurality of objects so that an effect of eliminating a virtual image is expected to be exerted. Especially, an effect of effectively eliminating a virtual image estimated from a human body area having a contradictory movement direction is expected to be exerted. Use of the positions and orientations of the cameras enables accurate comparison of the geometric attributes between different cameras regardless of the object image capturing direction and the distance, and the accuracy of the discrimination of whether the objects are the same object can be expected to increase. Further, the capacity to store the geometric attribute is small, so it can be expected to exert an effect of efficiently eliminating a virtual image with a small storage capacity and a small amount of transmission, compared to the cases of images and image features.

While the movement direction of the object is used as the geometric attribute in the present exemplary embodiment, the velocity or acceleration of the object may be used as the geometric attribute. For example, a vector representing the velocity or acceleration may be used as the geometric attribute. As in the case of the movement direction, the geometric attribute of the velocity or acceleration of the object can be calculated by object tracking as described in the present exemplary embodiment. Further, the consistency can be determined by a method similar to that discussed in the present exemplary embodiment. Use of the velocity or acceleration as the geometric attribute is expected to exert an effect of effectively eliminating a virtual image estimated from a human body area having a contradictory velocity or acceleration.

While the movement direction of the object is used as the geometric attribute in the present exemplary embodiment, the amount of change in size of the object may be used as the geometric attribute. For example, the amounts of change in width w and height h of the object may be used as the geometric attribute. This is expected to exert an effect of effectively eliminating a virtual image estimated from a human body area having a contradictory amount of change in size. The amount of change in size of the object can be acquired by, for example, object tracking as described in the present exemplary embodiment. At this time, if the intrinsic parameters of the cameras and the size of the object are known, the position of the object in the depth direction can be acquired. Then, the consistency can be determined by comparing in the three-dimensional space the positions of the object in the depth direction that are acquired from the respective cameras.

While a single geometric attribute is used in the first to third exemplary embodiments, a plurality of geometric attributes may be used in combination. Use of a combination of a plurality of geometric attributes is expected to exert an effect of more effectively eliminating a virtual image.

The following describes a fourth exemplary embodiment. FIG. 15 illustrates the functional configuration of an image processing apparatus 1500 according to the present exemplary embodiment. The image processing apparatus 1500 includes an information holding unit 1503, an object tracking unit 1502, a position storage unit 1523, an accuracy calculation unit 1509, and a position decision unit 1515. The image processing apparatus 1500 further includes an image acquisition unit 1501, a position generation unit 1504, a position merging unit 1524, a correspondence storage unit 1525, a position updating unit 1519, a position elimination unit 1522, and a display control unit 1526.

In the following description, the image processing apparatus 1500 includes two cameras having overlapping fields of view. As described above, each of the cameras includes the image sensor 301. The number of cameras is not particularly limited as long as it is any number that is not smaller than two.

The information holding unit 1503 holds information about intrinsic parameters, positions, and orientations of the respective cameras that are acquired by calibration. As to a method for the calibration, the method described above may be used.

The image acquisition unit 1501 acquires from each of a plurality of image capturing units a group of frame images that are consecutively captured. For example, the image acquisition unit 1501 can acquire from the respective cameras video images including a group of frame images that are consecutively captured. In the present exemplary embodiment, since two cameras are used, the image acquisition unit 1501 acquires two video images. Each of the units included in the image processing apparatus performs processing by referring to a plurality of frame images that are captured substantially simultaneously by the respective cameras.

The object tracking unit 1502 tracks the objects on the group of frame images acquired by the image acquisition unit 1501. For example, the object tracking unit 1502 can perform tracking processing on the respective frame images acquired by the image acquisition unit 1501. Consequently, an image area of a tracking target object is detected from the respective frame images. In the present exemplary embodiment, a person is tracked, so the object tracking unit 1502 extracts person areas from the images and associates the person area extracted from the image of the time of interest with the person area of the same person that is extracted from a past image. In this way, the same person can be tracked across a plurality of time points. As to a method for the tracking processing, a well-known method may be used. For example, person tracking can be performed by performing person detection processing on each of the consecutive images and associating persons detected from the respective images based on matching scores. Examples of a specific method include a method discussed in M. D. Breitenstein et al. "Robust tracking-by-detection using a detector confidence particle filter", 2009 IEEE 12th International Conference on Computer Vision (ICCV), pp. 1515-1522.

As a result of the tracking processing performed by the object tracking unit 1502, a set of a two-dimensional position and an identifier of a tracking target object included in each image is acquired. Hereinafter, an image area of a tracking target object will be referred to as a tracking result or simply as an object, and an identifier of a tracking target object will be referred to as an identifier of a tracking result. In the present exemplary embodiment, a set of a two-dimensional position and an identifier of a person included in each image is acquired. More specifically, a set of a two-dimensional position and an identifier of a person area included in each image is acquired. In the present exemplary embodiment, a person area is a rectangular area, and the coordinates (x, y) of a representative point, the height h, and the width w of the rectangular area are acquired as the two-dimensional position of the person area. The coordinates of the representative point may be, for example, the coordinates of a center of a detected face area, the coordinates of a center of a rectangular area, or the like. Further, a two-dimensional (2D) tracking label i is acquired as an identifier of a tracking result. The 2D tracking label i is a code for identifying a person tracked in an image of each camera. The 2D tracking label i is determined such that different 2D tracking labels i are assigned to different persons in an image captured by the same camera.

The position storage unit 1523 stores three-dimensional position information. Details thereof will be described below.

The position generation unit 1504 generates a candidate for the three-dimensional position of an object at the time of interest based on the positions of the object on the respective frame images and the positional relationship of the plurality of image capturing units. For example, the position generation unit 1504 can generate a new candidate for the three-dimensional position of a person based on the two-dimensional position of the person that is acquired by the tracking processing performed by the object tracking unit 1502. Specifically, the position generation unit 1504 generates a three-dimensional position candidate by associating two-dimensional positions of persons detected from the respective images. As used herein, the three-dimensional position refers to the position of a person in the three-dimensional space and is represented by coordinates (x, y, z). Further, the position generation unit 1504 assigns an identifier and attribute information to the three-dimensional position candidate. Hereinafter, a three-dimensional position candidate is sometimes referred to simply as a three-dimensional position.

The identifier refers to a code for identifying a generated three-dimensional position candidate, and, for example, a three-dimensional (3D) tracking label j can be used. The 3D tracking label j is determined such that different 3D tracking labels j are assigned to different three-dimensional positions. Further, the attribute information refers to a value or code that represents the property of the three-dimensional position. In the present exemplary embodiment, the attribute of the three-dimensional position is determined using the attribute (attribute of object) of the tracking result that corresponds to the three-dimensional position. For example, the color (color attribute) of a person can be used as the attribute. In another exemplary embodiment, the age, sex, height, direction, or size of a person, a feature amount extracted from a tracking result, or the like. can be used as the attribute in place of the color attribute. A specific example is as follows. The position generation unit 1504 can extract a feature amount from a tracking result on each frame image to which reference is made at the time of generating the three-dimensional position candidate, and the position generation unit 1504 can calculate as the attribute of the three-dimensional position a statistical amount, e.g., an average value, of the feature amount extracted from each frame image.

The position generation unit 1504 includes an associating unit 1505, a position estimation unit 1506, and an attribute extraction unit 1507. The associating unit 1505 associates the person tracked by the object tracking unit 1502 between images. The position estimation unit 1506 generates a candidate for the three-dimensional position of the person associated by the associating unit 1505. The attribute extraction unit 1507 acquires the attribute of the person associated by the associating unit 1505. Details thereof will be described below.

The position storage unit 1523 stores three-dimensional position information. For example, the position storage unit 1523 may store a set of the candidate for the three-dimensional position that is generated by the position generation unit 1504, the 3D tracking label j of the three-dimensional position, and the attribute of the three-dimensional position.

The position merging unit 1524 associates the candidate for the three-dimensional position at the time of interest with the candidate for the three-dimensional position at a past time that precedes the time of interest. In the present exemplary embodiment, the position merging unit 1524 merges the candidate for the three-dimensional position at the time of interest that is generated based on the positions of the object on the respective frame images and the positional relationship of the plurality of image capturing units, with the candidate for the three-dimensional position at the past time. In this way, the position merging unit 1524 associates the candidate for the three-dimensional position at the time of interest with the candidate for the three-dimensional position at the past time.

For example, the position merging unit 1524 merges into one the plurality of three-dimensional position candidates generated by the position generation unit 1504. By this processing, the three-dimensional positions that are determined as corresponding to the same person are merged. Further, as a result of the processing, the association of the candidate for the three-dimensional position at the time of interest with the candidate for the three-dimensional position of the object at the past time that precedes the time of interest is realized. It is not always required, however, to associate the three-dimensional positions by merging, and information indicating that the candidate for the three-dimensional position at the time of interest and the candidate for the three-dimensional position at the past time are determined as corresponding to the same person may be recorded.

There may be a case where a plurality of three-dimensional positions is generated for the same person as a result of the processing performed by the position generation unit 1504. Further, there may be a case where a plurality of three-dimensional positions exists for the same person due to an estimation error arising from the entire process illustrated in FIG. 16. Thus, in order to limit the three-dimensional position of the same person to one, the position merging unit 1524 searches for a plurality of three-dimensional positions that can be considered as the same person and merges the plurality of three-dimensional positions into one. Further, the position merging unit 1524 also merges a three-dimensional position candidate generated using the frame image of the time of interest, which is currently the processing target, with a three-dimensional position candidate generated using the frame image of the past time that precedes the time of interest. The correspondence storage unit 1525 stores information indicating that the three-dimensional positions merged by the position merging unit 1524 are the same person. Details thereof will be described below.

The accuracy calculation unit 1509 calculates an integrated correspondence accuracy indicating the degree of accuracy that the candidate for the three-dimensional position at the time of interest corresponds to the object. This processing is performed based on both a local correspondence accuracy, which indicates the degree of accuracy that the candidate for the three-dimensional position at the time of interest acquired based on the frame image of the time of interest corresponds to the object, and an integrated correspondence accuracy, which indicates the degree of accuracy that the candidate for the three-dimensional position at the past time corresponds to the object. In the present exemplary embodiment, the accuracy calculation unit 1509 calculates the correspondence accuracy based on the correspondence accuracy (local correspondence accuracy) between the three-dimensional position j and the tracking result i that take only the time of interest t into consideration, and the correspondence accuracy (integrated correspondence accuracy) between the three-dimensional position j and the tracking result i that is based on the past frame image. Details of a correspondence accuracy calculation method will be described below.

The foregoing correspondence accuracy is an index indicating the possibility that an object specified by a three-dimensional position candidate is the same as a tracked object, and indicates the degree by which a three-dimensional position and a tracking result correspond to the same person. In this way, the accuracy calculation unit 1509 calculates the correspondence accuracy between the three-dimensional position and the tracking result. As used here, the three-dimensional position refers to a three-dimensional position acquired by the merging processing performed by the position merging unit 1524, and each three-dimensional position is referred to as a three-dimensional position j using the 3D position label j. Further, the tracking result refers to a person tracked in the respective images by the processing performed by the object tracking unit 1502, and each tracking result is referred to as a tracking result i using the 2D position label i.

The accuracy calculation unit 1509 includes a distance calculation unit 1510, a difference calculation unit 1511, a local accuracy calculation unit 1512, an integrated accuracy calculation unit 1513, and an integrated accuracy storage unit 1514. The distance calculation unit 1510 calculates the distance of the object based on the three-dimensional position, the result of the object tracking unit 1502, and the positional relationship of the cameras. Specifically, the distance calculation unit 1510 calculates the distance on an image between the three-dimensional position projected on the image and the tracking result. The difference calculation unit 1511 calculates a difference between the color attribute of the three-dimensional position and the color attribute extracted from a person detected area of the tracking result. The local accuracy calculation unit 1512 calculates the correspondence accuracy (local correspondence accuracy) between the three-dimensional position and the tracking result that take only the time of interest t into consideration. Details thereof will be described below. The integrated accuracy calculation unit 1513 updates the integrated correspondence accuracy stored in the integrated accuracy storage unit 1514 to the local correspondence accuracy acquired in the local accuracy calculation unit 1512. Details thereof will be described below. The integrated accuracy storage unit 1514 records the acquired integrated correspondence accuracy as an integrated correspondence accuracy indicating the degree of accuracy that the candidate for the three-dimensional position at the time of interest corresponds to the object. The recorded integrated correspondence accuracy corresponds to a value acquired by integrating the local correspondence accuracies.

The position decision unit 1515 determines the three-dimensional position of the object at the time of interest based on the integrated correspondence accuracy. In the present exemplary embodiment, the position decision unit 1515 determines the candidate for the three-dimensional position at the time of interest that has a higher recorded integrated correspondence accuracy as a candidate that corresponds to the three-dimensional position of the object at the time of interest. In this way, the position decision unit 1515 decides the three-dimensional position based on the correspondence accuracies. In the present exemplary embodiment, a real image reliability indicating the likelihood that the three-dimensional position corresponds to a real image is calculated and used to decide that the three-dimensional position corresponds to a real image. Further, the correspondence relationship between the three-dimensional position and the tracking result is acquired. The position decision unit 1515 includes a reliability calculation unit 1516, a position selection unit 1517, and a result selection unit 1518. The reliability calculation unit 1516 calculates the real image reliability indicating the likelihood that the three-dimensional position corresponds to a real image. The position selection unit 1517 obtains a three-dimensional position having a high real image reliability and decides the obtained three-dimensional position as a real image. The result selection unit 1518 decides a tracking result corresponding to the three-dimensional position. Details of the foregoing process will be described below.

The position updating unit 1519 updates the three-dimensional position and the attribute by use of the correspondence relationship between the three-dimensional position and the tracking result that is acquired in the position decision unit 1515. The position updating unit 1519 includes a coordinate updating unit 1520 and an attribute updating unit 1521. The coordinate updating unit 1520 and the attribute updating unit 1521 update the three-dimensional position and the attribute that the three-dimensional position has, respectively. The position elimination unit 1522 eliminates an unnecessary three-dimensional position. The display control unit 1526 displays the object detection result and the three-dimensional position together with the camera image on the display.

Figure 16:
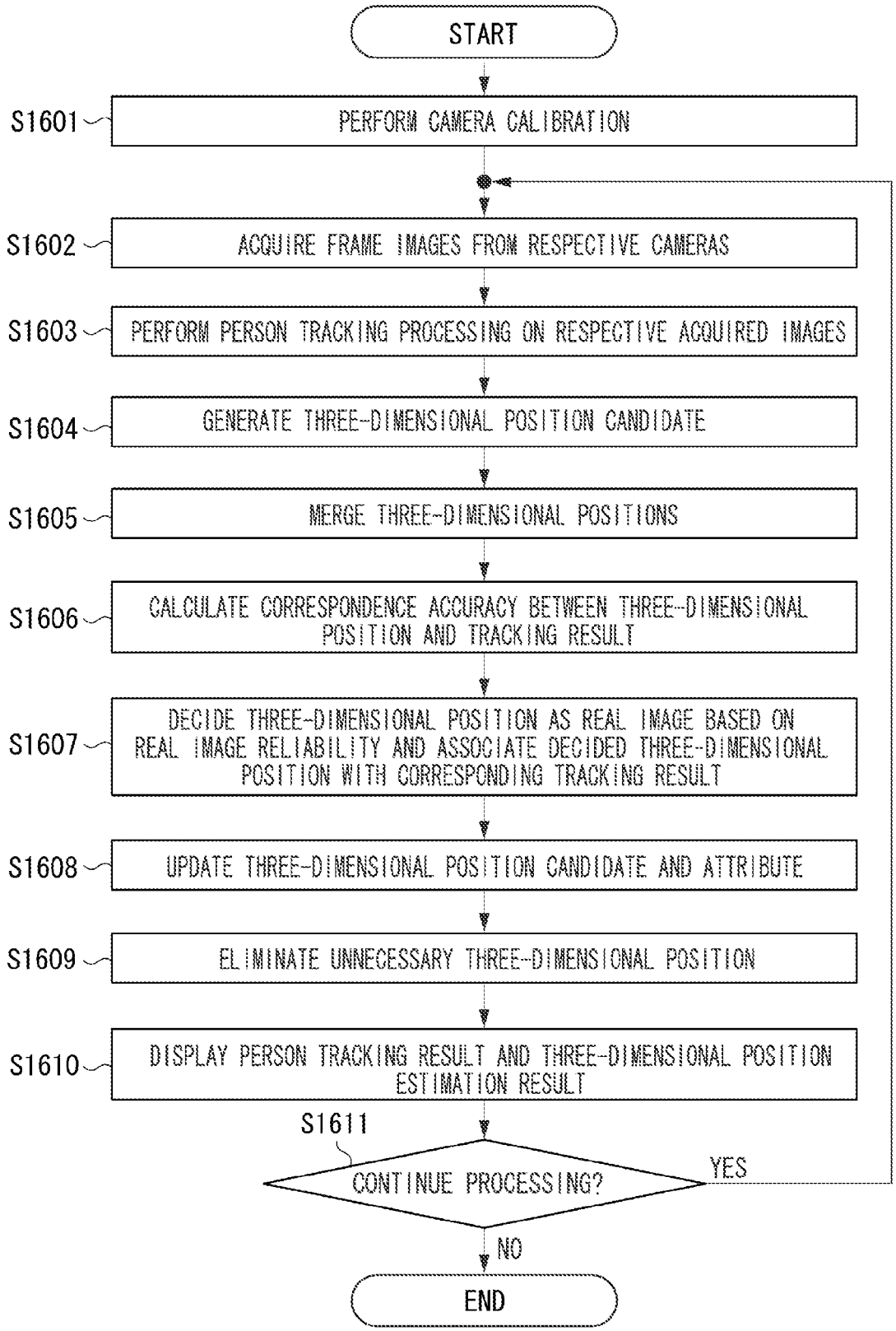
FIG. 16 is a flow chart illustrating a process according to the fourth exemplary embodiment.

The following describes operations of the image processing apparatus 1500 with reference to a flow chart illustrated in FIG. 16. In step S1601, calibration is performed as described above to estimate intrinsic parameters, positions, and orientations of the respective cameras, and these pieces of information are held in the information holding unit 1503. In step S1602, the image acquisition unit 1501 acquires frame images from the respective cameras as described above. In the following description, the image acquisition unit 1501 acquires a frame image of time t. In step S1603, the object tracking unit 1502 performs person tracking processing as described above and assigns the coordinates (x, y) of a representative point, height h, width w, and 2D tracking label i to the respective tracking results.

Figure 17:
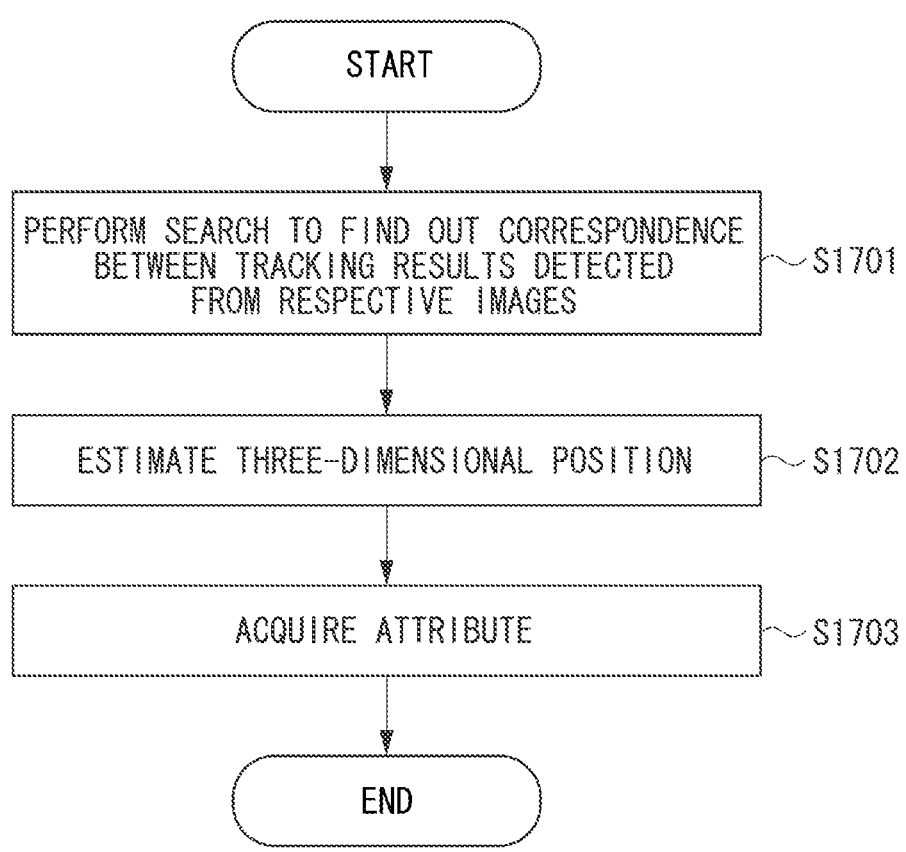
FIG. 17 is a flow chart illustrating a process of generating a three-dimensional position candidate.

In step S1604, the position generation unit 1504 generates a candidate for the three-dimensional position of the person as described above and stores information about the three-dimensional position in the position storage unit 1523. The following describes details of the processing performed in step S1604 with reference to FIG. 17. In step S1701, the position estimation unit 1506 performs a search to find out a correspondence between a tracking result detected from an image and a tracking result detected from another image. A method of associating the tracking results between images is not particularly limited, and examples include a method using epipolar geometry described above with reference to FIG. 5.

In step S1702, the position estimation unit 1506 estimates the three-dimensional position of the person based on the pairs of persons associated in step S1701. This estimation can be performed according to the triangulation principle. For example, an intersection point at which a straight line extending from the optical center of the camera A in the direction of the representative point of the person A intersects with a straight line extending from the optical center of the camera B in the direction of the representative point of the person B in the three-dimensional space can be acquired as the estimated three-dimensional position of the persons A and B estimated as the same person. A specific example is as follows. The position estimation unit 1506 acquires straight lines connecting the coordinates of the representative points of the persons on the respective camera images to the coordinates of the centers of the respective cameras in the three-dimensional space as illustrated in FIG. 6. Then, the position estimation unit 1506 acquires the coordinates at which the straight lines acquired from the plurality of cameras intersect. Technically, the straight lines rarely intersect, so the position estimation unit 106 can acquire the coordinates of a midpoint of a common perpendicular of the straight lines as the estimated three-dimensional position of the person instead of the coordinates of the intersection point.

In step S1703, the attribute extraction unit 1507 acquires the attributes of the pairs of persons associated in step S1701. In the present exemplary embodiment, the attribute extraction unit 1507 acquires the attributes of the tracking results included in the respective camera images and then acquires the attributes of the pairs of persons based on the acquired attribute values. A specific example is as follows. The attribute extraction unit 1507 may calculate the color attribute of the tracking result of the person A on the camera image 1 and the color attribute of the tracking result of the person B on the camera image 2. The color attribute may be, for example, an average of the colors of the tracking results. Then, the attribute extraction unit 107 may use the averages of the color attributes of the respective tracking results as the respective color attributes of the persons A and B.

In another exemplary embodiment, the associating unit 1505 may associate the persons by reference to the attributes of the tracking results in place of or in addition to the epipolar geometry. A specific example is as follows. In a case where an attribute error of each of the tracking results is not above a threshold value, the persons can be associated. In this case, prior to step S1701, the attribute extraction unit 1507 may acquire the attributes (e.g., color attributes) of the respective tracking results. Further, in step S1703, the attribute extraction unit 1507 may acquire the color attribute of the person by averaging the color attributes of the respective tracking results included in the corresponding camera images that are already acquired.

While the association between the two cameras is described in step S1604, the association can also be performed similarly even in a case where three or more cameras are used. For example, the association and the generation of a three-dimensional position candidate may be performed for each of the combinations of two cameras selected from the plurality of cameras. Further, the association and the generation of a three-dimensional position candidate may be performed using geometric constraints of multi-viewpoints.

By step S1604, a new three-dimensional position is generated based on the tracking result detected in step S1603. By this processing, a new real image candidate that is not detected in a previous frame image can be found.

In step S1605, the position merging unit 1524 merges the three-dimensional positions that are determined as corresponding to the same person as described above. In the present exemplary embodiment, if the distance between three-dimensional positions is small, it is determined that the three-dimensional positions represent the same person, and the position merging unit 124 merges the three-dimensional positions. A specific example is as follows. The position merging unit 1524 searches for three-dimensional positions having a distance from each other that is not greater than a predetermined value, and the position merging unit 1524 generates a group of three-dimensional positions having a short distance from each other. The three-dimensional positions grouped thus together are merged. Then, the position merging unit 124 calculates the average coordinates of the three-dimensional positions for each group and use the calculated average coordinates as the coordinates of the merged three-dimensional position.

In the present exemplary embodiment, the three-dimensional position generated by the position generation unit 1504 based on the frame image of the time of interest is also merged with the three-dimensional position generated by the position generation unit 1504 based on the past frame image if the distance between the three-dimensional positions is small. A specific example is as follows. The position merging unit 1524 may merge the merged three-dimensional position acquired by reference to the past frame image in previous step S1605 with the three-dimensional position candidate generated by reference to the frame image of the time of interest in current step S1604. In another exemplary embodiment, the three-dimensional position candidate generated based on the past frame image in past step S1604 may be merged with the three-dimensional position candidate generated based on the frame image of the time of interest in current step S1604.

As to the attribute and the 3D tracking label j of the merged three-dimensional position, the attribute and the 3D tracking label j of one of the three-dimensional positions before being merged are adopted. In the present exemplary embodiment, the attribute and the 3D tracking label j of the three-dimensional position that exists from the oldest time are adopted. This configuration can be realized by adding information indicating the time of generation to the three-dimensional position. It is, however, also possible to use any other adoption criteria. Further, in a case where two or more candidates for the three-dimensional position at the past time that are determined as corresponding to different objects are merged, the position merging unit 124 may record information indicating that the two or more three-dimensional positions correspond to the same object. For example, the position merging unit 1524 may record information indicating that the three-dimensional position having the 3D tracking label that is not adopted and the three-dimensional position having the 3D tracking label that is adopted represent the same person. A specific example is as follows. The position merging unit 1524 may record in the correspondence storage unit 1525 information indicating that the 3D tracking labels are the same.

While the three-dimensional positions having a short distance from each other are merged in the present exemplary embodiment, a merging method is not limited to the foregoing method, and the three-dimensional positions to be merged may be determined according to other criteria. For example, the distance between the three-dimensional position candidate at the time of interest and the three-dimensional position candidate at the past time may be used. Further, a difference between the attribute of the object corresponding to the three-dimensional position candidate at the time of interest and the attribute of the object corresponding to the three-dimensional position candidate at the past time may be used. Based on at least one of the foregoing, the three-dimensional position candidate at the time of interest and the three-dimensional position candidate at the past time can be merged. For example, the three-dimensional positions having similar attributes may be merged, or the three-dimensional positions to be merged may be determined based on both the distance between the three-dimensional positions and the difference between the attributes of the three-dimensional positions. In the present exemplary embodiment, the object corresponding to the three-dimensional position candidate at the current time or the past time may be an object (tracking result) on the respective frame images to which reference is made at the time of generating the three-dimensional position candidate. Further, the object corresponding to the three-dimensional position candidate at the past time may be an object (tracking result) selected on each frame image as an object having an integrated correspondence accuracy of a correspondence to the candidate for the three-dimensional position that is not below a predetermined value and having a highest integrated correspondence accuracy.

By step S1605, a plurality of real image candidates that may be the same person can be narrowed down to 1. This processing is expected to increase the real image identification accuracy. Further, a redundant three-dimensional position is eliminated so that an effect of reducing the amount of calculation is expected to be exerted.

Figure 18:
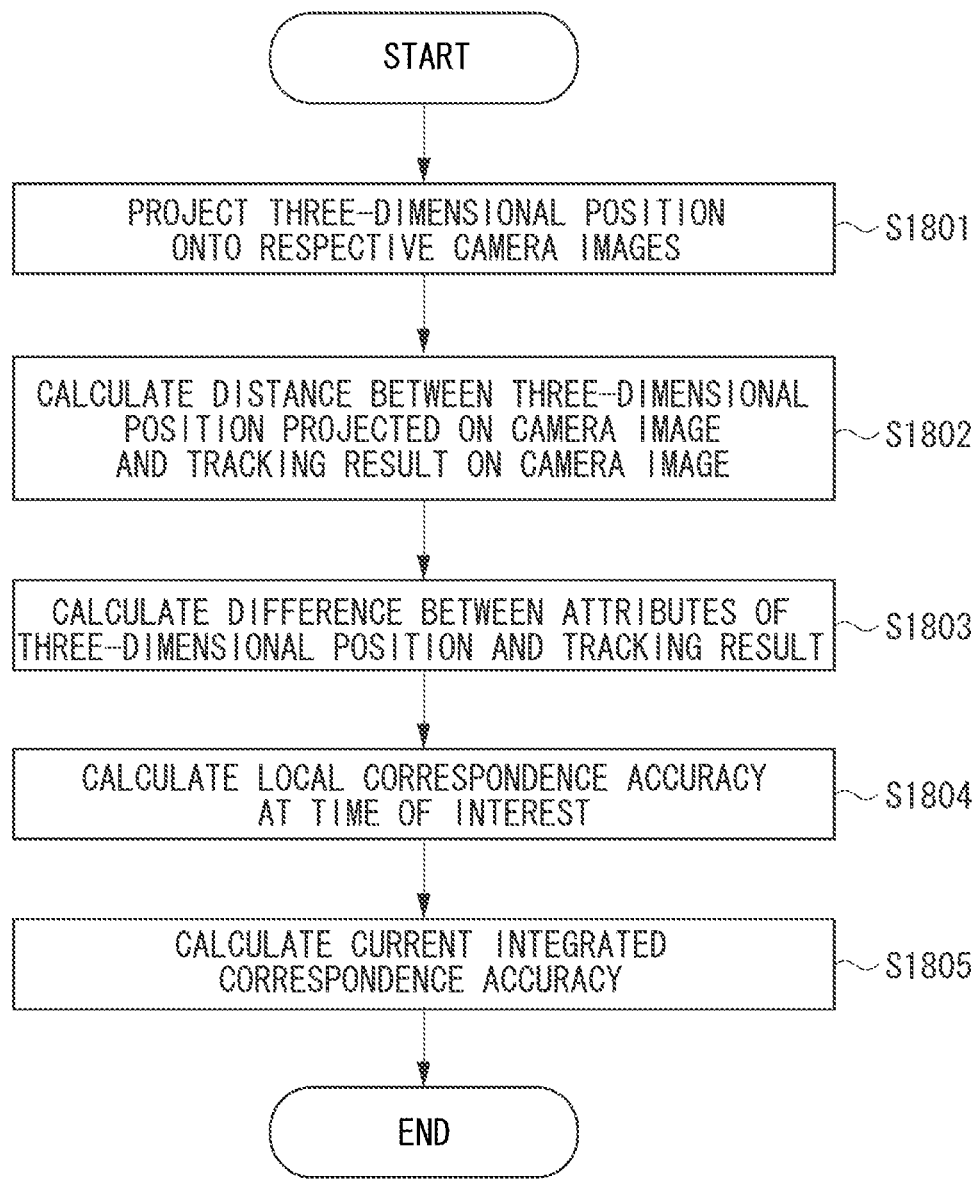
FIG. 18 is a flow chart illustrating a process of calculating a correspondence accuracy.

In step S1606, the accuracy calculation unit 1509 calculates the correspondence accuracy between the three-dimensional position and the tracking result as described above. The following describes details of step S1606 with reference to a flow chart illustrated in FIG. 18. In the present exemplary embodiment, the correspondence accuracy is calculated for each three-dimensional position j acquired by merging the three-dimensional position candidate at the time of interest with the three-dimensional position candidate at the past time. Alternatively, the correspondence accuracy may be calculated for the three-dimensional position candidate at the time of interest or the three-dimensional position candidate acquired by merging a plurality of three-dimensional positions at the time of interest.

Figure 19A:
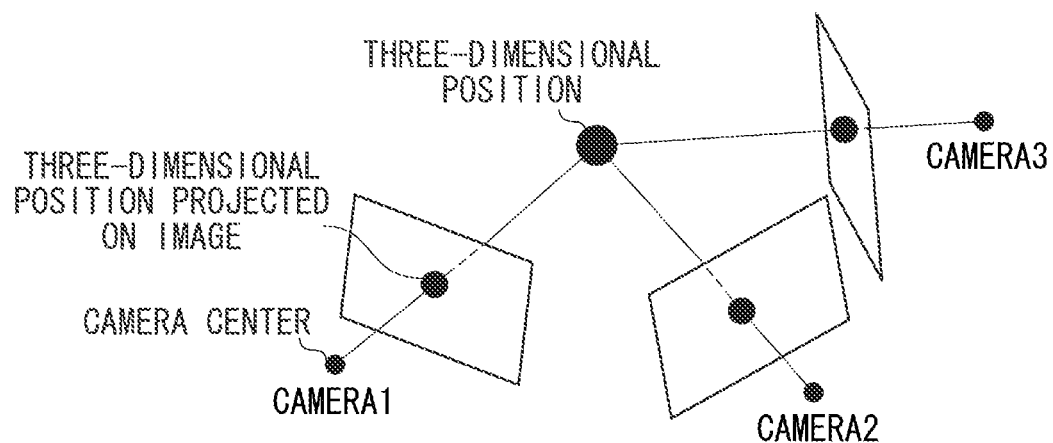
FIGS. 19A and 19B illustrate the distance between a three-dimensional position candidate and an object that are projected on an image.
Figure 19B:
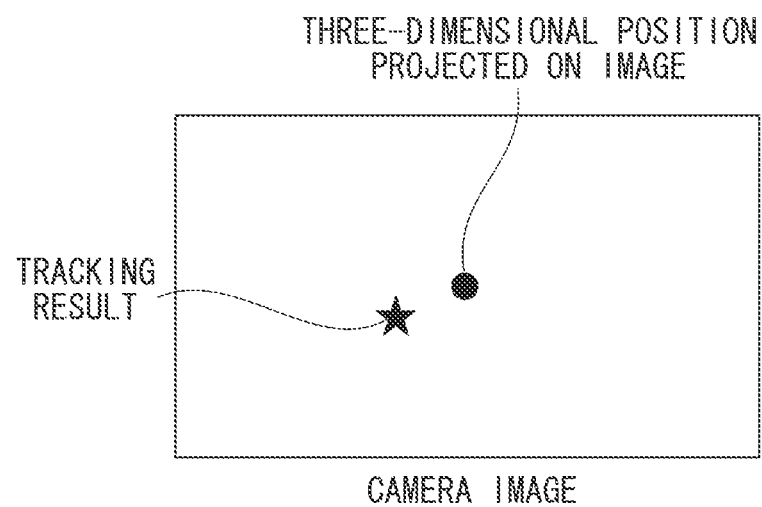

In step S1801, the distance calculation unit 1510 projects each three-dimensional position j onto the respective camera images as illustrated in FIG. 19A. Next, in step S1802, the distance calculation unit 1510 calculates the distance between the three-dimensional position j projected on the camera image and the tracking result i on the camera image as illustrated in FIG. 19B. The following describes a case where, for example, persons A and B are tracked on a camera image 1 and persons C and D on a camera image 2. In this case, first, the distance between the three-dimensional position j projected on the camera image 1 and the tracking result of the person A and the distance between the three-dimensional position j projected on the camera image 1 and the tracking result of the person B are calculated. Further, the distance between the three-dimensional position j projected on the camera image 2 and the tracking result of the person C and the distance between the three-dimensional position j projected on the camera image 2 and the tracking result of the person D are calculated. Further, the foregoing calculations are performed for each three-dimensional position j.

In step S1803, the difference calculation unit 1511 calculates a difference between the attribute of the three-dimensional position j and the attribute of the tracking result i. As used herein, the attribute of the tracking result i refers to an attribute extracted from a person detected area corresponding to the tracking result i. In the present exemplary embodiment, the attribute of the three-dimensional position j and the attribute of the tracking result i refer to a color attribute. Further, in the present exemplary embodiment, a squared error of a red-green-blue (RGB) value of the color attribute of the three-dimensional position j and a RGB value of the color attribute of the tracking result i is used as the difference between the color attribute of the three-dimensional position j and the color attribute of the tracking result i. In the above case where the persons A and B are tracked on the camera image 1 and the persons C and D on the camera image 2, the differences between the three-dimensional position j and the respective persons A, B, C, and D are calculated. Further, the foregoing calculations are performed for each three-dimensional position j.

In step S1804, the local accuracy calculation unit 1512 calculates the local correspondence accuracy indicating the degree of accuracy that the three-dimensional position j corresponds to the tracking result i. At this time, at least one of the distance between the position corresponding to the candidate for the three-dimensional position at the time of interest on the frame image of the time of interest and the position of the object and the difference between the attribute of the object corresponding to the candidate for the three-dimensional position at the time of interest and the attribute of the object may be used. A specific example is as follows. The local accuracy calculation unit 1512 may calculate the local correspondence accuracy based on at least one of the distance calculated in step S1802 and the difference in attribute that is calculated in step S1803. The object corresponding to the three-dimensional position candidate may be the object on the respective frame images to which reference is made at the time of generating the three-dimensional position candidate.

For example, the local accuracy calculation unit 1512 calculates the local correspondence accuracy $s^t_{i,j}$ based on the distance calculated in step S1802 and the difference in attribute that is calculated in step S1803. The local accuracy calculation unit 1512 may calculate the local correspondence accuracy such that the smaller the distances and differences are, the higher the local correspondence accuracy is. A specific example is as follows. The local accuracy calculation unit 1512 may calculate the weighted mean of the distance calculated in step S1802 and the difference calculated in step S1803 by use of an arbitrary weighting and then calculate a reciprocal number of the weighted mean acquired as the local correspondence accuracy. While the local accuracy calculation unit 1512 calculates the local correspondence accuracy based on both the distance and the difference in the present exemplary embodiment, the local correspondence accuracy may be calculated based on only one of the distance and the difference. By step S1804, the local correspondence accuracies between the three-dimensional position j and the respective persons A, B, C, and D are calculated. Further, the foregoing calculations are performed for each three-dimensional position j. In this way, the local correspondence accuracies are calculated based on the frame image of the time of interest.

In step S1805, the integrated accuracy calculation unit 1513 calculates the current integrated correspondence accuracy between the three-dimensional position j and the tracking result i based on the local correspondence accuracy $s^t_{i,j}$ acquired in step S1804 and the integrated correspondence accuracy $a^{t-1}_{i,j}$ acquired in the past. The current integrated correspondence accuracy $a^t_{i,j}$ thus acquired corresponds to the integrated correspondence accuracy calculated using the frame image of the time of interest t. Further, the integrated correspondence accuracy $a^{t-1}_{i,j}$ acquired in the past refers to the integrated correspondence accuracy calculated using the frame image of time t−1.

The integrated accuracy calculation unit 1513 may calculate the current integrated correspondence accuracy $a^t_{i,j}$ such that the higher the local correspondence accuracy $s^t_{i,j}$ and the past integrated correspondence accuracy $a^{t-1}_{i,j}$ are, the higher the current integrated correspondence accuracy is. For example, the integrated accuracy calculation unit 1513 may calculate as the current integrated correspondence accuracy $a^t_{i,j}$ the weighted mean of the local correspondence accuracy $s^t_{i,j}$ and the past integrated correspondence accuracy $a^{t-1}_{i,j}$ by use of an arbitrary weighting. Specific examples include a method using the following formula:

$$a^{t}_{i,j} = (1-w)a^{t-1}_{i,j} + ws^{t}_{i,j},$$

where w is an updating weighting. Normally, 0<w<1.

In step S1805, the integrated accuracy calculation unit 1513 further records in the integrated accuracy storage unit 1514 the current integrated correspondence accuracy $a^{t}_{i,j}$ having a value that is not below a threshold value. At the time of calculating the integrated correspondence accuracy $a^{t+1}_{i,j}$ using the frame image of time t+1 in step S1607, which is the subsequent step, reference is made to the recorded integrated correspondence accuracy $a^{t}_{i,j}$ as the past integrated correspondence accuracy. On the other hand, if the current integrated correspondence accuracy is below a predetermined value, the integrated accuracy calculation unit 113 does not record the integrated correspondence accuracy. If the integrated correspondence accuracy $a^{t}_{i,j}$ between the three-dimensional position j and the tracking result i is below the threshold value, the integrated accuracy calculation unit 1513 determines that the three-dimensional position j and the tracking result i have little relationship, and the integrated accuracy calculation unit 1513 discards the integrated correspondence accuracy $a^{t}_{i,j}$ without recording.

In step S1607, the position decision unit 1515 calculates for each three-dimensional position j the real image reliability $L_j$ indicating the likelihood of a real image by use of the integrated correspondence accuracy $a^{t}_{i,j}$ between the three-dimensional position j and the tracking result i. Then, the position decision unit 1515 decides the three-dimensional position j as a three-dimensional position representing a real image, based on the real image reliability $L_j$. Specifically, in order to increase the real image reliability of a three-dimensional position j decided as a real image, the position decision unit 1515 decides several three-dimensional positions j as a three-dimensional position representing a real image. Then, the position decision unit 1515 assigns a corresponding tracking result to the three-dimensional position decided as a real image and records the correspondence relationship between the three-dimensional position j decided as a real image and the tracking result i. FIG. 20 illustrates details of step S1607. In the process illustrated in FIG. 20, steps S2001 to S2004 are repeatedly executed until it is determined not to continue the processing in step S2004.

In step S2001, the reliability calculation unit 1516 calculates the real image reliability $L_j$ indicating the likelihood that the three-dimensional position j is a real image. The reliability calculation unit 1516 calculates the real image reliability $L_j$ of the three-dimensional position j such that the higher the integrated correspondence accuracy $a^{t}_{i,j}$ of the tracking result i is, the higher the real image reliability $L_j$ is. Specific examples include the following method. The following processing is performed using all the three-dimensional positions j that are not decided as a real image in step S2003 and all the tracking results i that are not decided as a tracking result corresponding to a real image in step S2003.

First, the reliability calculation unit 1516 acquires for each candidate for the three-dimensional position at the time of interest the integrated correspondence accuracy recorded in association with an object tracked on one group of frame images. For example, the reliability calculation unit 1516 searches for a tracking result i with the highest integrated correspondence accuracy $a^{t}_{i,j}$ on each camera image.

In the present exemplary embodiment, one tracking result i on each camera image corresponds to one three-dimensional position j. The following describes the case where, for example, the persons A and B are tracked on the camera image 1 and the persons C and D on the camera image 2 and no three-dimensional position j is yet decided as a real image. In this case, the reliability calculation unit 1516 selects an object with the highest integrated correspondence accuracy among the one or more objects tracked on the frame image group. Then, the integrated correspondence accuracy recorded in association with the selected object is selected as the integrated correspondence accuracy for the frame image group. For example, the tracking result of one of the persons A and B that is with a higher integrated correspondence accuracy with respect to the three-dimensional position j is selected as a tracking result on the camera image 1. Further, the tracking result of one of the persons C and D that is with a higher integrated correspondence accuracy with respect to the three-dimensional position j is selected as a tracking result on the camera image 2.

Then, the reliability calculation unit 1516 calculates the real image reliability of the three-dimensional position candidate based on the integrated correspondence accuracies acquired for the plurality of frame images. For example, the reliability calculation unit 116 calculates as the real image reliability $L_j$ of the three-dimensional position j a total of the integrated correspondence accuracies between the tracking results selected for the respective camera images and the three-dimensional position j. Specifically, the real image reliability $L_j$ of the three-dimensional position j can be expressed by the following formula:

$$L_j = \sum_{i \in A_j} a^{t}_{i,j}.$$

In the foregoing formula, $A_j$ is a set of tracking results corresponding to the three-dimensional position j. Since one tracking result i on each camera image corresponds to one three-dimensional position j, the maximum number of tracking results included in $A_j$ is one per camera, and the maximum value of the number of elements of $A_j$ is the number of cameras. As described above, the real image reliability $L_j$ can be calculated by temporarily associating a tracking result i with each three-dimensional position j to increase the real image reliability $L_j$. The reliability calculation unit 1516 calculates the real image reliability $L_j$ with respect to each three-dimensional position j as described above.

In step S2002, the position selection unit 1517 determines a three-dimensional position candidate having a higher real image reliability as a candidate corresponding to the three-dimensional position of the object at the time of interest. For example, the position selection unit 1517 selects a three-dimensional position j having the highest real image reliability $L_j$ acquired in step S2001. The selected three-dimensional position j is decided as a three-dimensional position representing a real image. The thus decided three-dimensional position is not selected in subsequent step S2001.

The position selection unit 1517 may select a three-dimensional position candidate that has the highest real image reliability and to which a predetermined number or more of objects correspond, and the position selection unit 1517 may determine that the selected three-dimensional position candidate corresponds to the three-dimensional position of the object at the time of interest. The predetermined number is not particularly limited as long as it is any number that is not smaller than two. In a case where there is only one object corresponding to the three-dimensional position candidate, that is to say, in a case where there is only one frame image including the object corresponding to the three-dimensional position candidate, it is likely that the three-dimensional position is not accurately calculated.

In step S2003, the result selection unit 1518 decides the tracking results selected with respect to the respective camera images in step S2001 as tracking results corresponding to the three-dimensional position j selected in step S2002. In another exemplary embodiment, the tracking results used to generate the three-dimensional position j may be decided as tracking results corresponding to the three-dimensional position j. As described above, the object corresponding to the three-dimensional position candidate may be an object on the respective frame images to which reference is made at the time of generating the three-dimensional position candidate. Further, the object corresponding to the three-dimensional position candidate may be an object selected on each frame image as an object having an integrated correspondence accuracy of a correspondence to the candidate for the three-dimensional position that is not below a predetermined value and having a highest integrated correspondence accuracy.

In step S2003, elimination processing is further performed to eliminate the selected three-dimensional position candidate and the object (tracking result) corresponding to the three-dimensional position candidate from a choice in the selection processing to be performed in step S2002. For example, the thus decided tracking result is not selected in subsequent step S2002.

In step S2004, the reliability calculation unit 1516 determines whether the three-dimensional positions and the tracking results that remain undecided include a three-dimensional position and a tracking result that can be associated. If a three-dimensional position and a tracking result that can be associated are included (YES in step S2004), the processing returns to step S2001. On the other hand, if a three-dimensional position and a tracking result that can be associated are not included (NO in step S2004), the process illustrated in FIG. 10 is ended.

For example, in step S1805, a combination of a three-dimensional position and a tracking result with a high integrated correspondence accuracy is recorded. Meanwhile, the three-dimensional position can be determined accurately if there are two or more camera images including a tracking result having a high correspondence accuracy with a three-dimensional position. From this point of view, if the number of camera images including a tracking result having a high correspondence accuracy with respect to a three-dimensional position is not larger than 1, it can be determined that the three-dimensional position can be associated with no tracking result. Then, if all the three-dimensional positions can be associated with no tracking result, it can be determined that the three-dimensional positions and the tracking results that remain undecided do not include a three-dimensional position and a tracking result that can be associated.

In steps S2001 to S2004 described above, the selection processing, in which the three-dimensional position with the highest real image reliability is selected and decided and the tracking results corresponding to the three-dimensional position are decided, and the elimination processing, in which the selected three-dimensional position and the tracking results are eliminated, are repeated. The search for a combination of tracking results to be assigned to a three-dimensional position as described above increases the real image reliability of a three-dimensional position to be decided as a real image, whereby an effect of increasing the collation accuracy between the three-dimensional position and the tracking results is expected to be exerted. Performing the repetition processing as described above is advantageous in that a three-dimensional position representing a real image can be selected with a high reliability even if the integrated correspondence accuracy at a past time is not taken into consideration. Further, a method for the collation of a three-dimensional position with tracking results is not particularly limited, as long as any method can be used by which the real image reliability of a three-dimensional position decided as a real image is high. While the search for a combination is performed by the greedy method in the present exemplary embodiment, any other combination search method may be used. Further, in order to increase the sum of real image reliabilities of the respective three-dimensional positions, the search for a combination of tracking results to be assigned to a three-dimensional position may be performed using a round-robin or other search method.

As the foregoing described, in step S1606, the three-dimensional position is collated with the tracking results to calculate the integrated correspondence accuracy that is an index indicating that the three-dimensional position and the tracking results are the same object. Further, in step S1607, whether the three-dimensional position is a real image is determined using the integrated correspondence accuracy. By the foregoing processing, a three-dimensional position that is a virtual image can be eliminated effectively, so the accuracy of the three-dimensional position estimation can be expected to increase. Especially, at the time of calculating the integrated correspondence accuracy, reference is also made to the correspondence accuracies of a plurality of past frames in addition to the local correspondence accuracy acquired based on the frame image of the time of interest t. This enables collation of the three-dimensional position with the tracking results based on the past frame images of a long period of time, so an effect of effectively eliminating a virtual image is expected to be exerted.

Further, according to the present exemplary embodiment, the integrated correspondence accuracy is recorded in association with the combination of the three-dimensional position and the tracking results, and the three-dimensional position is collated with the tracking results by use of the recorded integrated correspondence accuracy. Thus, it is not always necessary to refer to the past camera images and to store the positions, 2D tracking labels, etc. of tracking results acquired by past object tracking to refer to the stored information for each frame. The foregoing configuration is expected to exert an effect of decreasing the storage area size and the amount of calculation.

Further, in step S1606, the collation of the three-dimensional position with the racking result is performed using both the distance between the three-dimensional position projected on the camera image and the tracking result on the image and the difference between the attributes. This configuration enables effective collation using both the distance and the difference between the attributes even in a case where the collation is difficult to be performed by use of only one of the distance and the difference. It is not always necessary, however, to use both the distance and the difference between the attributes, and the collation may be performed using only one of the distance and the difference, or any other information may be used.

Further, in step S1607, the real image reliability $L_j$ is calculated as a sum of the correspondence accuracies $a^t_{i,j}$. Thus, the larger the number of tracking results corresponding to the three-dimensional position is, the higher the real image reliability $L_j$ is. As described above, in an exemplary embodiment, the real image reliability of the three-dimensional position candidate is calculated such that the larger the number of frame image groups for which the integrated correspondence accuracy is acquired is, the higher the real image reliability is. In the multi-viewpoint geometry, there is a characteristic that the larger the number of cameras capturing an object is, the lower the association ambiguity is. In the method according to the present exemplary embodiment, the real image reliability $L_j$ is calculated such that the larger the number of tracking results corresponding to the three-dimensional position is, the higher the real image reliability $L_j$ is. Thus, the three-dimensional position that is associated with tracking results on a larger number of camera images is more likely to be decided as a real image, so an effect of increasing the accuracy is expected to be exerted.

In step S1608, the position updating unit 1519 calculates the three-dimensional position of the object based on the positions of the object on the respective frame images that corresponds to the three-dimensional position candidate determined as corresponding to the three-dimensional position of the object at the time of interest and the positional relationship of the plurality of image capturing units. For example, the position updating unit 1519 can calculate the coordinates of the three-dimensional position by use of the correspondence relationship between the three-dimensional position and the tracking result that is acquired in step S1607. Further, the position updating unit 1519 can update the candidate for the three-dimensional position at the time of interest to the three-dimensional position of the object determined as a corresponding object. The updated candidate for the three-dimensional position can be used in the subsequent merging processing in step S1605.

For example, the coordinate updating unit 1520 can calculate the coordinates of the three-dimensional position again by use of the tracking results on the respective camera images that correspond to the three-dimensional position. In the present exemplary embodiment, the coordinates of the three-dimensional position are calculated using the coordinates of the tracking result detected from the frame image of the time of interest t. Specifically, as in step S1702, the coordinates can be calculated according to the triangulation principle based on the coordinates of the representative points of the tracking results on the camera images and the coordinates of the camera centers. In a case of calculating the coordinates of the three-dimensional position by use of the tracking results on three or more camera images, respective straight lines connecting the coordinates of the camera centers to the coordinates of the representative points of the tracking results on the camera images in the three-dimensional space are acquired, and the closest coordinates to the straight lines can be calculated. Specifically, the coordinates at which the sum of squares of distances from the straight lines is minimum can be acquired as the coordinates of the three-dimensional position corresponding to the tracking results on the camera images.

Further, the attribute updating unit 1521 can update the attribute of the three-dimensional position based on the attributes of the tracking results. For example, the attribute of the three-dimensional position can be acquired based on pixel values of the tracking results on the respective camera images. Specifically, the mean value of the pixel values of the tracking results on the respective camera images can be acquired as the attribute of the three-dimensional position.

As described above, the coordinates and attribute of the three-dimensional position candidate recorded in the position storage unit 1523 are updated by the processing in step S1608. The updated coordinates and attribute of the three-dimensional position candidate can be used in the subsequent merging processing in step S1605. It is not always required, however, to update the coordinates and attribute of the three-dimensional position candidate recorded in the position storage unit 1523.

In step S1609, the position elimination unit 122 eliminates an unnecessary three-dimensional position. For example, the position elimination unit 1522 can eliminate a three-dimensional position candidate that is generated at a past time and is neither determined as corresponding to an object for a predetermined period or longer nor merged with a three-dimensional position candidate for a predetermined period or longer. Specifically, a three-dimensional position that has not been decided as a real image in step S1607 for a period of a predetermined number of frames or larger may be eliminated. The elimination of an unnecessary three-dimensional position is expected to exert an effect of decreasing the storage area and the amount of calculation in steps S1605 to S1608.

In step S1610, the display control unit 1526 displays on the display device the person tracking result and the three-dimensional position estimation result that are acquired by the foregoing processing. For example, the display control unit 1526 can display on the display device the three-dimensional position decided as a real image in step S1607 and the positions of the tracking results on the respective images that correspond to the three-dimensional position decided as a real image.

FIG. 11 illustrates an example of the configuration of a screen displayed on the display device. The screen illustrated in FIG. 11 includes one or more camera images 1101 and a three-dimensional map 1104. FIG. 11 illustrates an example of a display of a case where four cameras are used, and the four camera images 1101 are images captured by the respective cameras.

On each of the camera images 1101, symbols (frames) indicating the tracking results acquired in step 1603 are superimposed. In the present exemplary embodiment, frames indicating the tracking results on the respective camera images that correspond to the three-dimensional position decided as a real image in step S407 are superimposed on the respective camera images 1101. The frames that indicate the same person are displayed in the same color even on different camera images so that the user can recognize with ease whether persons shown on different cameras are the same person.

On the three-dimensional map 1104, symbols 1103 indicating the three-dimensional positions of the persons that are acquired from the position storage unit 1523 and symbols 1102 indicating the positions and directions of the respective cameras are displayed together with a floor surface as a three-dimensional image. In the present exemplary embodiment, the three-dimensional positions decided as a real image in step S407 are displayed on the three-dimensional map 1104. The frames indicating the tracking results on the camera images 1101 and the respective symbols indicating the three-dimensional positions on the three-dimensional map 1104 are displayed in the same colors so that the user can recognize with ease whether the persons on the camera images 1101 and the three-dimensional map 1104 are the same person.

In step S1605, information indicating that the merged three-dimensional positions represent the same person is stored in the correspondence storage unit 1525. As described above, in the case where information indicating that several three-dimensional positions represent the same person is stored in the correspondence storage unit 1525, the three-dimensional map 1104 may be displayed such that the user can recognize that the three-dimensional positions represent the same person. For example, in the case where several three-dimensional positions are merged in step S1605, a mark having the same color as that of a symbol representing the person corresponding to the three-dimensional positions that are to be merged can be displayed in the vicinity of a symbol representing the person corresponding to the three-dimensional positions merged in step S1605. As described above, the correspondence storage unit 1525 is included to make it possible to indicate that different three-dimensional positions represent the same person. The foregoing configuration is efficiently applicable to, for example, a case of calculating a long-term three-dimensional trajectory of a person by video image analysis processing, a case of identifying a person, or the like, as well as a case of simply displaying a tracking result.

In the example illustrated in FIG. 11, the respective persons are displayed in different colors to show whether the persons are the same person. In another example, a unique number, character, symbol, etc. of a person may be superimposed on the camera images 1101 or the three-dimensional map 1104 to increase visibility. Further, while the three-dimensional positions are displayed in the three-dimensional space by use of the three-dimensional map 1104 in the example illustrated in FIG. 11, the three-dimensional positions may be displayed on a two-dimensional map. When the three-dimensional positions are displayed on a three-dimensional map, the positions of the persons in the height direction in addition to the positions of the persons on the floor surface can be acquired from the three-dimensional map. Especially in a case where the position of a person is determined based on a head portion, such as a case where object tracking is performed based on face recognition, the body height of the person can be determined from the three-dimensional map. On the other hand, when the three-dimensional positions are displayed on a two-dimensional map, an effect of being able to visually recognize with ease the positions of the persons on the floor surface is exerted.

Further, the viewpoint of the three-dimensional map 1104 may be fixed, or a mechanism by which the user can change the viewpoint may be provided. Further, items that can be displayed on the three-dimensional map 1104 are not limited to those described above. For example, a layout diagram showing the layout of furniture, or the like may be superimposed on the floor surface, or any other object may be superimposed. In this way, the positional relationship between a person and an object around the person can be presented in an easy-to-understand manner.

In step S1611, the image acquisition unit 1501 determines whether to continue the processing. If a new frame image can be acquired from the cameras (YES in step S1611), the processing returns to step S1602, and the processing is repeated using a newly acquired frame image. On the other hand, if no new frame image can be acquired from the cameras, or if a user instruction to end the processing is given (NO in step S1611), the process illustrated in FIG. 16 is ended.

At the time of calculating the real image reliability $L_j$, reference may be made to a parameter other than the integrated correspondence accuracy $a'_{i,j}$. For example, in the present exemplary embodiment, a three-dimensional position that has not been decided as a real image for a long time is eliminated. Accordingly, a longer presence time of a three-dimensional position indicates a higher frequency of association of a tracking result, i.e., a higher likelihood that the three-dimensional position is a real image. Thus, the real image reliability $L_j$ may be calculated such that the longer the presence time of the three-dimensional position j is, the higher the real image reliability $L_j$ is. In an exemplary embodiment, the real image reliability of a three-dimensional position candidate is calculated such that the older the time of generation of the three-dimensional position candidate with which the candidate for the three-dimensional position at the time of interest is merged is, the higher the real image reliability is. Being merged with a three-dimensional position candidate generated at an older time indicates a longer presence time of the three-dimensional position j. For example, the real image reliability $L_j$ can be acquired from the following formula:

$$L_j = \sum_{i \in A_j} d^t_{i,j} + \alpha T_j,$$

where $T_j$ is the presence time of the three-dimensional position j. In the foregoing formula, $\alpha$ is a constant. The foregoing configuration is expected to exert an effect of selecting more accurately a three-dimensional position representing a real image and eliminating a virtual image.

In the present exemplary embodiment, the integrated correspondence accuracy is calculated as a sum of a local correspondence accuracy and a past integrated correspondence accuracy, and the real image reliability is calculated as a sum of integrated correspondence accuracies. Alternatively, the integrated correspondence accuracy may be calculated as a product of a local correspondence accuracy and a past integrated correspondence accuracy, and the real image reliability may be calculated as a product of integrated correspondence accuracies. In this case, the integrated correspondence accuracy and the real image reliability can be calculated not as a likelihood but as a probability.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-074942, filed Apr. 1, 2015, and No. 2015-131841, filed Jun. 30, 2015, which are hereby incorporated by reference herein in their entirety.

What is claimed is:

1. An image processing apparatus comprising:
a holding unit configured to hold a positional relationship of a plurality of image capturing units;
an acquisition unit configured to detect objects from respective images captured by the plurality of image capturing units and acquire positions of the objects on the captured images and geometric attributes of the objects;
a selection unit configured to select a combination of objects to be associated, based on the positional relationship and the positions of the objects on the respective captured images;
a determination unit configured to determine a consistency of the selected combination based on a degree of similarity between the geometric attributes of the respective objects belonging to the combination;
an associating unit configured to associate the objects in the combination based on the consistency of the combination; and
an estimation unit configured to estimate a three-dimensional position of the objects based on the positional relationship and the positions of the detected objects.

2. The image processing apparatus according to claim 1, wherein the determination unit calculates a degree of similarity between a geometric attribute of an object detected from an image captured by an image capturing unit of interest in the plurality of image capturing units and a geometric attribute of a projection of an object detected from an image captured by another one of the plurality of image capturing units onto the image captured by the image capturing unit of interest, and the determination unit determines the consistency of the combination based on the degree of similarity.

3. The image processing apparatus according to claim 1, wherein the determination unit calculates a degree of consistency of the three-dimensional position.

4. The image processing apparatus according to claim 3, wherein based on an assumption that the objects exist in the estimated three-dimensional position, the determination unit calculates a degree of similarity between the geometric attributes of the objects that are acquired from the respective captured images, and a degree of consistency of the three-dimensional position based on the calculated degree of similarity.

5. The image processing apparatus according to claim 3, wherein the associating unit associates a combination having a high degree of consistency.

6. The image processing apparatus according to claim 3, wherein the associating unit eliminates a combination having a low degree of consistency.

7. The image processing apparatus according to claim 1, wherein based on the positional relationship, the selection unit obtains a straight line on a captured image of a first image capturing unit that connects a second image capturing unit to an object detected at the second image capturing unit, and the selection unit selects a combination of an object having a distance from the straight line that is equal to or smaller than a threshold value among objects detected at the first image capturing unit and the object detected at the second image capturing unit.

8. The image processing apparatus according to claim 1, wherein the geometric attribute is an object size.

9. The image processing apparatus according to claim 1, wherein the geometric attribute is an object direction.

10. The image processing apparatus according to claim 1, wherein the geometric attribute is an object motion.

11. The image processing apparatus according to claim 1, wherein the plurality of image capturing units includes a first image capturing unit, a second image capturing unit, and a third image capturing unit,
wherein the estimation unit estimates the three-dimensional position of the objects based on positions of the objects on respective captured images of the first image capturing unit and the second image capturing unit, and
wherein the image processing apparatus further comprises a complementation unit configured to complement a detection failure by the acquisition unit by projecting a geometric attribute of the object acquired from the captured image of the first image capturing unit or the second image capturing unit onto a captured image of the third image capturing unit, based on an assumption that the objects exist in the estimated three-dimensional position.

12. The image processing apparatus according to claim 1, further comprising an image display unit configured to superimpose on the captured image a symbol indicating the position on the acquired captured image.

13. An image processing apparatus comprising:
a holding unit configured to hold a positional relationship of a plurality of image capturing units;
an acquisition unit configured to detect objects from respective images captured by the plurality of image capturing units and acquire positions of the objects on the captured images and geometric attributes of the objects;
an associating unit configured to associate the detected objects, based on the positional relationship, the positions, and the geometric attributes;
an estimation unit configured to estimate a three-dimensional position of the objects based on the positional relationship and the positions of the detected objects; and
a map display unit configured to superimpose on a two-dimensional or three-dimensional map a symbol indicating the estimated three-dimensional position of the objects.

14. An image processing method comprising:
detecting objects from respective images captured by a plurality of image capturing units and acquiring positions of the objects on the captured images and geometric attributes of the objects;
selecting a combination of objects to be associated, based on a positional relationship of the plurality of image capturing units that is held in a holding unit and the positions of the objects on the respective captured images;
determining a consistency of the selected combination based on a degree of similarity between the geometric attributes of the respective objects belonging to the combination;
associating the objects in the combination based on consistency of the combination; and
estimating a three-dimensional position of the objects based on the positional relationship and the positions of the associated objects on the respective captured images.

15. A non-transitory computer-readable storage medium storing a program that causes a computer to function as:

a holding unit configured to hold a positional relationship of a plurality of image capturing units;
an acquisition unit configured to detect objects from respective images captured by the plurality of image capturing units and acquire positions of the objects on the captured images and geometric attributes of the objects;
a selection unit configured to select a combination of objects to be associated, based on the positional relationship and the positions of the objects on the respective captured images;
a determination unit configured to determine a consistency of the selected combination based on a degree of similarity between the geometric attributes of the respective objects belonging to the combination;
an associating unit configured to associate the objects in the combination based on the consistency of the combination; and
an estimation unit configured to estimate a three-dimensional position of the objects based on the positional relationship and the positions of the objects associated by the associating unit on the respective captured images.

16. An image processing apparatus comprising:
an acquisition unit configured to acquire a group of frame images captured consecutively from each of a plurality of image capturing units having overlapping fields of view;
a tracking unit configured to track an object on the group of frame images;
a generation unit configured to generate a candidate for a three-dimensional position of the object at a time of interest based on a position of the object on a frame image and a positional relationship of the plurality of image capturing units;
an associating unit configured to associate the candidate for the three-dimensional position at the time of interest with a candidate for the three-dimensional position of the object at a past time that precedes the time of interest;
a calculation unit configured to calculate an integrated correspondence accuracy indicating a degree of accuracy that the candidate for the three-dimensional position at the time of interest corresponds to the object, based on a local correspondence accuracy indicating a degree of accuracy that the three-dimensional position candidate at the time of interest corresponds to the object and an integrated correspondence accuracy indicating a degree of accuracy that the three-dimensional position candidate at the past time corresponds to the object; and
a determination unit configured to determine the three-dimensional position of the object at the time of interest based on the calculated integrated correspondence accuracy.

17. The image processing apparatus according to claim 16, wherein the determination unit acquires for each candidate for the three-dimensional position at the time of interest the integrated correspondence accuracy recorded in association of an object tracked on one group of frame images,
wherein the determination unit calculates a reliability of the candidate for the three-dimensional position based on the acquired integrated correspondence accuracy for each of a plurality of groups of frame images, and
wherein the determination unit determines the three-dimensional position of the object at the time of interest based on the reliability.

18. The image processing apparatus according to claim 17, wherein the determination unit selects from among one or more objects tracked on the group of frame images an object having the highest integrated correspondence accuracy, and the determination unit selects as an integrated correspondence accuracy with respect to the group of frame images the integrated correspondence accuracy recorded in association with the selected object.

19. The image processing apparatus according to claim 17, wherein in a case where the integrated correspondence accuracy is below a predetermined value, the calculation unit inhibits recording of the integrated correspondence accuracy.

20. The image processing apparatus according to claim 17, wherein the determination unit calculates a reliability of the three-dimensional position candidate such that the larger the number of groups of frame images for which the integrated correspondence accuracy is acquired is, the higher the reliability is.

21. The image processing apparatus according to claim 17, wherein the associating unit merges the candidate for the three-dimensional position at the time of interest with the candidate for the three-dimensional position at the past time to associate the candidate for the three-dimensional position at the time of interest with the candidate for the three-dimensional position at the past time.

22. The image processing apparatus according to claim 21, wherein the determination unit calculates the reliability of the candidate for the three-dimensional position such that the older the time of generation of the candidate for the three-dimensional position with which the candidate for the three-dimensional position at the time of interest is merged is, the higher the reliability is.

23. The image processing apparatus according to claim 21, wherein the associating unit merges the candidate for the three-dimensional position at the time of interest with the candidate for the three-dimensional position at the past time based on at least one of a distance between the candidate for the three-dimensional position at the time of interest and the candidate for the three-dimensional position at the past time and a difference between an attribute of an object corresponding to the candidate for the three-dimensional position at the time of interest and an attribute of an object corresponding to the candidate for the three-dimensional position at the past time.

24. The image processing apparatus according to claim 21, wherein in a case where two or more candidates for the three-dimensional position at the past time that are determined as corresponding to different objects are merged, the associating unit records information indicating that the two or more three-dimensional positions correspond to the same object.

25. The image processing apparatus according to claim 21, wherein the associating unit eliminates a candidate for the three-dimensional position that is generated at a past time and is neither determined as corresponding to an object for a predetermined period or longer nor merged with a candidate for the three-dimensional position for a predetermined period or longer.

26. The image processing apparatus according to claim 23, wherein the object corresponding to the candidate for the three-dimensional position is one of an object on each frame image to which reference is made at a time of generating the candidate for the three-dimensional position and an object selected on each frame image as an object having an integrated correspondence accuracy of a correspondence to the candidate for the three-dimensional position that is not below a predetermined value and having a highest integrated correspondence accuracy.

27. The image processing apparatus according to claim 17, wherein the determination unit repeats
selection processing in which a candidate for the three-dimensional position which has a highest reliability and to which a predetermined number or more of objects correspond is selected and determined as corresponding to the three-dimensional position of the object at the time of interest, and
elimination processing in which the selected candidate for the three-dimensional position and an object corresponding to the selected candidate for the three-dimensional position are eliminated from a choice in the selection processing.

28. The image processing apparatus according to claim 16, wherein the calculation unit calculates the local correspondence accuracy based on a distance on a frame image of the time of interest between a position corresponding to the candidate for the three-dimensional position at the time of interest and the position of the object.

29. The image processing apparatus according to claim 16, wherein the calculation unit calculates the local correspondence accuracy based on a difference between an attribute of an object corresponding to the candidate for the three-dimensional position at the time of interest and an attribute of the object.

30. The image processing apparatus according to claim 16, further comprising a unit configured to calculate the three-dimensional position of the object based on the positional relationship of the plurality of image capturing units and a position of the object on each frame image that corresponds to the candidate for the three-dimensional position determined as corresponding to the three-dimensional position of the object at the time of interest.

31. The image processing apparatus according to claim 30, further comprising a unit configured to update the candidate for the three-dimensional position at the time of interest to the three-dimensional position of the object determined as a corresponding object.

32. The image processing apparatus according to claim 16, wherein the integrated correspondence accuracy is an index indicating a possibility that an object represented by the candidate for the three-dimensional position is the same as the tracked object.

33. An image processing method comprising:
acquiring a group of frame images captured consecutively from each of a plurality of image capturing units having overlapping fields of view;
tracking an object on the group of frame images;
generating a candidate for a three-dimensional position of the object at a time of interest based on a position of the object on a frame image and a positional relationship of the plurality of image capturing units;
associating the candidate for the three-dimensional position at the time of interest with a candidate for the three-dimensional position of the object at a past time that precedes the time of interest;
calculating an integrated correspondence accuracy indicating a degree of accuracy that the candidate for the three-dimensional position at the time of interest corresponds to the object, based on a local correspondence accuracy indicating a degree of accuracy that the three-dimensional position candidate at the time of interest corresponds to the object and an integrated correspondence accuracy indicating a degree of accuracy that the three-dimensional position candidate at the past time corresponds to the object; and
determining the three-dimensional position of the object at the time of interest based on the calculated integrated correspondence accuracy.

34. A non-transitory computer-readable storage medium storing a program that causes a computer to function as:
an acquisition unit configured to acquire a group of frame images captured consecutively from each of a plurality of image capturing units having overlapping fields of view;
a tracking unit configured to track an object on the group of frame images;
a generation unit configured to generate a candidate for a three-dimensional position of the object at a time of interest based on a position of the object on a frame image and a positional relationship of the plurality of image capturing units;
an associating unit configured to associate the candidate for the three-dimensional position at the time of interest with a candidate for the three-dimensional position of the object at a past time that precedes the time of interest;
a calculation unit configured to calculate an integrated correspondence accuracy indicating a degree of accuracy that the candidate for the three-dimensional position at the time of interest corresponds to the object, based on a local correspondence accuracy indicating a degree of accuracy that the three-dimensional position candidate at the time of interest corresponds to the object and an integrated correspondence accuracy indicating a degree of accuracy that the three-dimensional position candidate at the past time corresponds to the object; and
a determination unit configured to determine the three-dimensional position of the object at the time of interest based on the calculated integrated correspondence accuracy.

35. An image processing method comprising:
detecting objects from respective images captured by a plurality of image capturing units and acquiring positions of the objects on the captured images and geometric attributes of the objects;
associating the detected objects, based on a positional relationship of the plurality of image capturing units that is held in a holding unit, the positions of the objects, and the geometric attributes of the objects;
estimating a three-dimensional position of the objects based on the positional relationship and the positions of the associated objects on the respective captured images; and
superimposing on a two-dimensional or three-dimensional map a symbol indicating the estimated three-dimensional position of the objects.

36. A non-transitory computer-readable storage medium storing a program that causes a computer to function as:
a holding unit configured to hold a positional relationship of a plurality of image capturing units;
an acquisition unit configured to detect objects from respective images captured by the plurality of image capturing units and acquire positions of the objects on the captured images and geometric attributes of the objects;
an associating unit configured to associate the detected objects, based on the positional relationship, the positions, and the geometric attributes;

an estimation unit configured to estimate a three-dimensional position of the objects based on the positional relationship and the positions of the objects associated by the associating unit on the respective captured images; and
a map display unit configured to superimpose on a two-dimensional or three-dimensional map a symbol indicating the estimated three-dimensional position of the objects.

* * * * *